(12) United States Patent
Borst et al.

(10) Patent No.: US 12,082,182 B2
(45) Date of Patent: Sep. 3, 2024

(54) DYNAMIC RESOURCE ALLOCATION METHOD FOR COEXISTENCE OF RADIO TECHNOLOGIES

(71) Applicant: Nokia Solutions and Networks Oy, Espoo (FI)

(72) Inventors: Simon Borst, Maplewood, NJ (US); Fabiano Chaves, Morris Plains, NJ (US); Harish Viswanathan, Morristown, NJ (US)

(73) Assignee: Nokia Solutions and Networks Oy, Espoo (FI)

( * ) Notice: Subject to any disclaimer, the term of this patent is extended or adjusted under 35 U.S.C. 154(b) by 273 days.

(21) Appl. No.: 17/441,383

(22) PCT Filed: May 10, 2019

(86) PCT No.: PCT/US2019/031742
§ 371 (c)(1),
(2) Date: Sep. 21, 2021

(87) PCT Pub. No.: WO2020/231384
PCT Pub. Date: Nov. 19, 2020

(65) Prior Publication Data
US 2022/0183020 A1    Jun. 9, 2022

(51) Int. Cl.
*H04W 72/12* (2023.01)
(52) U.S. Cl.
CPC ............................. *H04W 72/1215* (2013.01)
(58) Field of Classification Search
CPC ............................................... H04W 72/1215
(Continued)

(56) References Cited

U.S. PATENT DOCUMENTS

| | | | |
|---|---|---|---|
| 9,084,265 B2 | 7/2015 | Moe et al. | |
| 2004/0029591 A1* | 2/2004 | Chapman | H04W 72/0453 455/450 |

(Continued)

FOREIGN PATENT DOCUMENTS

WO    WO-2010/091713 A1    8/2010

OTHER PUBLICATIONS

International Search Report PCT/ISA/210 for International Application No. PCT/US2019/031742 Dated May 10, 2019.

(Continued)

*Primary Examiner* — Mark G. Pannell
(74) *Attorney, Agent, or Firm* — Nokia Solutions and Networks Oy

(57) ABSTRACT

A system, apparatus, method, and non-transitory computer readable medium for resource sharing between at least a first radio access network (RAN) and a second RAN may include at least one base station and a resource manager corresponding to the at least one base station. The resource manager may determine whether to allocate at least one future slot of a radio frame of the common carrier as a first RAN slot or a second RAN slot based on received RAN resource utilization information corresponding to a current slot of the radio frame of the common carrier, or active connection information corresponding to active RAN connections served by the base station; generate RAN resource allocation information corresponding to the at least one future slot based on results of the determining, and transmit the RAN resource allocation information to at least one RAN scheduler corresponding to the base station.

20 Claims, 10 Drawing Sheets

(58) Field of Classification Search
USPC .......................................................... 370/329
See application file for complete search history.

(56) References Cited

U.S. PATENT DOCUMENTS

| | | | |
|---|---|---|---|
| 2007/0259675 A1* | 11/2007 | Worrall ................. | H04W 72/20 |
| | | | 455/458 |
| 2007/0280175 A1* | 12/2007 | Cheng ................... | H04W 72/20 |
| | | | 370/338 |
| 2008/0144612 A1 | 6/2008 | Honkasalo et al. | |
| 2008/0279144 A1 | 11/2008 | Kikuchi | |
| 2009/0207815 A1* | 8/2009 | Parkvall ............... | H04B 7/2656 |
| | | | 370/336 |
| 2010/0304771 A1* | 12/2010 | Dottling ................ | H04L 5/0007 |
| | | | 455/509 |
| 2013/0058316 A1* | 3/2013 | Hirsch .............. | H04W 72/1215 |
| | | | 370/336 |
| 2013/0303114 A1 | 11/2013 | Ahmad et al. | |
| 2014/0056254 A1 | 2/2014 | Panchal et al. | |
| 2014/0355567 A1 | 12/2014 | Irmer et al. | |
| 2016/0135057 A1 | 5/2016 | Wang et al. | |

OTHER PUBLICATIONS

Written Opinion of the International Searching Authority PCT/ISA/237 for International Application No. PCT/US2019/031742 Dated May 10, 2019.

Extended European Search Reported for European Patent Application No. 19928721.0 dated Nov. 17, 2022.

\* cited by examiner

DYNAMIC RESOURCE ALLOCATION METHOD FOR COEXISTENCE OF RADIO TECHNOLOGIES

CROSS-REFERENCE TO RELATED APPLICATIONS

This application is a national phase under 35 U.S.C. § 371 of PCT International Application No. PCT/US2019/031742 which has an International filing date of May 10, 2019, the entire contents of which are hereby incorporated by reference.

BACKGROUND

Field

Various example embodiments relate to methods, apparatuses, systems, and/or non-transitory computer readable media for dynamic resource allocation enabling the coexistence of a plurality of radio technologies.

Description of the Related Art

Currently, a $5^{th}$ generation mobile network (5G) standard, referred to as 5G New Radio (NR), is being developed to provide higher capacity, higher reliability, and lower latency communications than the 4G LTE standard. In connection with the development of the 5G NR standard, cellular network operators are preparing their current networks, which are adapted for 4G LTE devices, for operation with new 5G NR devices. However, many operators may initially not have separate radio spectrum reserved specifically for use with 5G NR devices, and therefore these operators are looking to support 4G LTE devices and 5G NR devices using the same radio spectrum (e.g., a same carrier, etc.). The operators also seek the ability to gradually transition the radio spectrum currently assigned for 4G LTE communications to 5G NR communications as the number of 5G NR devices proliferate on their networks.

Accordingly, an approach is desired that allows a cellular network operator to dynamically support the coexistence of a plurality of radio technologies, such as 4G LTE devices, 5G NR devices, etc., on their existing cellular network using the same carrier radio resources for the plurality of radio technologies.

SUMMARY

At least one example embodiment relates to a system for resource sharing between at least a first cellular radio access network (RAN) and a second RAN sharing a common carrier.

In at least one example embodiment, the system may include at least one base station, the at least one base station configured to operate a first RAN and a second RAN using at least one common carrier, and a resource manager corresponding to the at least one base station. The resource manager may be configured to determine whether to allocate at least one future slot of a radio frame of the common carrier as a first RAN slot or a second RAN slot based on received first RAN resource utilization information and received second RAN resource utilization information corresponding to a current slot of the radio frame of the common carrier, or active connection information corresponding to active first RAN connections served by the at least one base station and active second RAN connections served by the at least one base station. The resource manager may also be configured to generate first RAN resource allocation information and second RAN resource allocation information corresponding to the at least one future slot based on results of the determining, and transmit the first RAN resource allocation information and the second RAN resource allocation information to at least one RAN scheduler corresponding to the at least one base station.

Some example embodiments of the system provide that the at least one RAN scheduler may be configured to assign at least one first RAN resource block associated with the at least one future slot to the at least one first RAN UE device connected to the first RAN network based on the first RAN resource allocation information, and assign at least one second RAN resource block associated with the at least one future slot to the at least one second RAN UE device connected to the second RAN network based on the second RAN resource allocation information, and the system may further comprise a connection manager corresponding to the at least one base station. The connection manager may be configured to determine whether to transmit a connection mode instruction to the at least one first RAN UE device to establish a connection to the second RAN network based on an amount of data that has been transmitted to or by the at least one first RAN UE device, and an overhead associated with connecting the at least one first RAN UE device to the second RAN network.

Some example embodiments of the system provide that the at least one RAN scheduler may include at least a first RAN scheduler and a second RAN scheduler. The first RAN scheduler may be configured to determine first RAN channel state information associated with first RAN network connections to the first RAN operated by the at least one base station over the current slot, and determine the first RAN resource utilization information based on the first RAN channel state information. The second RAN scheduler may be configured to determine second RAN channel state information associated with second RAN network connections to the second RAN operated by the at least one base station over the current slot, and determine the second RAN resource utilization information based on the second RAN channel state information.

Some example embodiments of the system provide that the first RAN scheduler may be configured to receive downlink and uplink buffer status information corresponding to the at least one first RAN UE device connected to the first RAN network from a connection manager corresponding to the at least one base station, the downlink and uplink buffer status information corresponding to the at least one first RAN UE device including current or historic downlink and uplink buffer status information corresponding to the at least one first RAN UE device, and determine the first RAN resource utilization information based on the downlink and uplink buffer status information from the at least one first RAN UE device. The second RAN scheduler may be configured to receive downlink and uplink buffer status information corresponding to the at least one second RAN second UE device connected to the second RAN network from the connection manager, the downlink and uplink buffer status information corresponding to the at least one second RAN UE device including current or historic downlink and uplink buffer status information corresponding to the at least one second RAN UE device, and determine the second RAN resource utilization information based on the downlink and uplink buffer status information from the at least one second RAN UE device.

Some example embodiments of the system provide that the first RAN scheduler may be configured to calculate a first aggregate proportional fair score for the at least one first RAN UE device over the current slot, the second RAN scheduler may be configured to calculate a second aggregate proportional fair score for the at least one second RAN UE device over the current slot, and the resource manager may be further configured to determine whether to allocate the at least one future slot as a first RAN slot or a second RAN slot based on the calculated first aggregate proportional fair score and the calculated second aggregate proportional fair score.

Some example embodiments of the system provide that the at least one scheduler may be a hybrid RAN scheduler, the hybrid RAN scheduler may include the resource manager, and the at least one base station may include the hybrid RAN scheduler.

Some example embodiments of the system provide that the at least one base station may include the first RAN scheduler and the second RAN scheduler, and the resource manager may be located on a backend network connected to the at least one base station.

Some example embodiments of the system provide that the at least one base station may include at least a first base station and a second base station, the first base station may include the first RAN scheduler, and the second base station may include the second RAN scheduler.

Some example embodiments of the system provide that the at least one RAN scheduler may be configured to calculate a first aggregate proportional fair score for the at least one first RAN UE devices connected to the at least one base station over a previous resource window of the common carrier, transmit the first aggregate proportional fair score to the resource manager, calculate a second aggregate proportional fair score for the at least one second RAN UE devices connected to the at least one base station over the previous resource window, and transmit the second aggregate proportional fair score to the resource manager. The resource manager may be further configured to determine the first RAN resource allocation information and the second RAN resource allocation information by determining a first number of resource blocks of a future resource window of the common carrier, the future resource window including a plurality of resource blocks, and a second number of resource blocks of the future resource window based on the first aggregate proportional fair score and the second aggregate proportional fair score, the first number associated with first RAN connections, and the second number associated with second RAN connections.

Some example embodiments of the system provide that the resource manager may be further configured to determine a number of active first RAN UE devices connected to the at least one base station over a previous resource window of the common carrier, determine a number of active second RAN UE devices connected to the at least one base station over the previous resource window, and determine the first RAN resource allocation information and the second RAN resource allocation information by determining a first number of resource blocks of a future resource window of the common carrier, the future resource window including a plurality of resource blocks, and a second number of resource blocks of the future resource window based on the number of active first RAN UE devices and the number of active second RAN UE devices, the first number associated with first RAN connections, and the second number associated with second RAN connections.

At least one example embodiment relates to a method for resource sharing between at least a first cellular radio access network (RAN) and a second RAN sharing a common carrier.

In at least one example embodiment of the method, the method may include receiving, using at least one processor, first RAN resource utilization information and second RAN resource utilization information corresponding to a current slot of a radio frame of a common carrier, or receiving, using the at least one processor, active connection information corresponding to active first RAN connections served by the at least one base station and active second RAN connections; determining, using the at least one processor, whether to allocate at least one future slot of a radio frame of the common carrier as a first RAN slot or a second RAN slot based on the received first RAN resource utilization information and the received second RAN resource utilization information, or the received active connection information; generating, using the at least one processor, first RAN resource allocation information and second RAN resource allocation information corresponding to the at least one future slot based on results of the determining; and transmitting, using the at least one processor, the first RAN resource allocation information and the second RAN resource allocation information to at least one RAN scheduler corresponding to at least one base station.

Some example embodiments of the method provide that the at least one RAN scheduler may include at least a first RAN scheduler and a second RAN scheduler. The first RAN scheduler may be caused to assign at least one first RAN resource block associated with the at least one future slot to at least one first RAN UE device connected to the at least one base station based on the first RAN resource allocation information, the second RAN scheduler may be caused to assign at least one second RAN resource block associated with the at least one future slot to at least one second RAN UE device connected to the at least one base station based on the second RAN resource allocation information, and the method may further include determining, using the at least one processor, whether to transmit a connection mode instruction to the at least one first RAN UE device to establish a connection to the second RAN network based on an amount of data that has been transmitted to or by the at least one first RAN UE device, and an overhead associated with connecting the at least one first RAN UE device to the second RAN network.

Some example embodiments of the method provide that the first RAN resource utilization information may include first RAN channel state information associated with the first RAN network connections over the at least one current slot, and the second RAN resource utilization information includes second RAN channel state information associated with the second RAN network connections over the current slot.

Some example embodiments of the method provide that the first RAN resource utilization information may include downlink and uplink buffer status information corresponding to the at least one first RAN UE device connected to the first RAN network from a connection manager corresponding to the at least one base station, the downlink and uplink buffer status information corresponding to the at least one first RAN UE device including current or historic downlink and uplink buffer status information corresponding to the at least one first RAN UE device, and the second RAN resource utilization information may include downlink and uplink buffer status information corresponding to the at least one second RAN second UE device connected to the second RAN network from the connection manager, the downlink and uplink buffer status information corresponding to the at least one second RAN UE device including current or historic downlink and uplink buffer status information corresponding to the at least one second RAN UE device.

Some example embodiments of the method provide that the first RAN resource utilization information may include a first aggregate proportional fair score for the at least one first RAN UE device connected to the at least one base station over the at least one current slot, and the second RAN resource utilization information may include a second aggregate proportional fair score for the at least one second RAN UE device connected to the at least one base station over the at least one current slot.

Some example embodiments of the method provide that the first RAN resource utilization information may include a first aggregate proportional fair score for at least one first RAN UE device connected to the first RAN network over a previous resource window of the common carrier, the second RAN resource utilization information may include a second aggregate proportional fair score for at least one second RAN UE devices connected to the second RAN network over the previous resource window, and the determining the 4G resource allocation information and the 5G resource allocation information may include determining a first number of first RAN resource blocks of a future resource window of the common carrier and a second number of second RAN resource blocks of the future resource window based on the first aggregate proportional fair score and the second aggregate proportional fair score, the first number associated with first RAN connections, and the second number associated with second RAN connections, the future resource window including a plurality of resource blocks.

Some example embodiments of the method provide that the method may include determining, using the at least one processor, a number of active first RAN UE devices connected to the at least one base station over a previous resource window of the common carrier; determining, using the at least one processor, a number of active second RAN UE devices connected to the at least one base station over the previous resource window; and the determining the first RAN resource allocation information and the second RAN resource allocation information includes determining a first number of first RAN resource blocks of a future resource window of the common carrier and a second number of second RAN resource blocks of the future resource window based on the number of active first RAN UE devices and the number of active second RAN UE devices, the first number associated with first RAN connections, and the second number associated with second RAN connections, the future resource window including a plurality of resource blocks.

Some example embodiments of the method provide that the at least one RAN scheduler may be a hybrid RAN scheduler, and the at least one base station may include the hybrid RAN scheduler and the at least one processor.

Some example embodiments of the method provide that the at least one RAN scheduler may include at least a first RAN scheduler and a second RAN scheduler, and the at least one base station may include the first RAN scheduler and the second RAN scheduler.

At least one example embodiment relates to a network device for enabling the sharing of common carrier resources between at least one first radio access network (RAN) user equipment (UE) device connected to a first RAN network, and at least one second RAN UE device connected to a second RAN network.

In at least one example embodiment of the network device, the network device may include a memory having computer readable instructions stored thereon, and at least one processor configured to execute the computer readable instructions to determine an amount of data transmitted to or by at least one first RAN UE device connected to a first RAN network during a desired time period, determine whether to transmit a connection mode instruction to the at least one first RAN UE device to establish a connection to a second RAN network based on the determined amount of data, and an overhead associated with connecting the at least one first RAN UE device to the second RAN network, and establish a connection between the at least one first RAN UE device and the second RAN network based on results of the determination.

BRIEF DESCRIPTION OF THE DRAWINGS

The accompanying drawings, which are incorporated in and constitute a part of the specification, illustrate one or more example embodiments and, together with the description, explain these example embodiments. In the drawings.

DETAILED DESCRIPTION

Figure 1A:
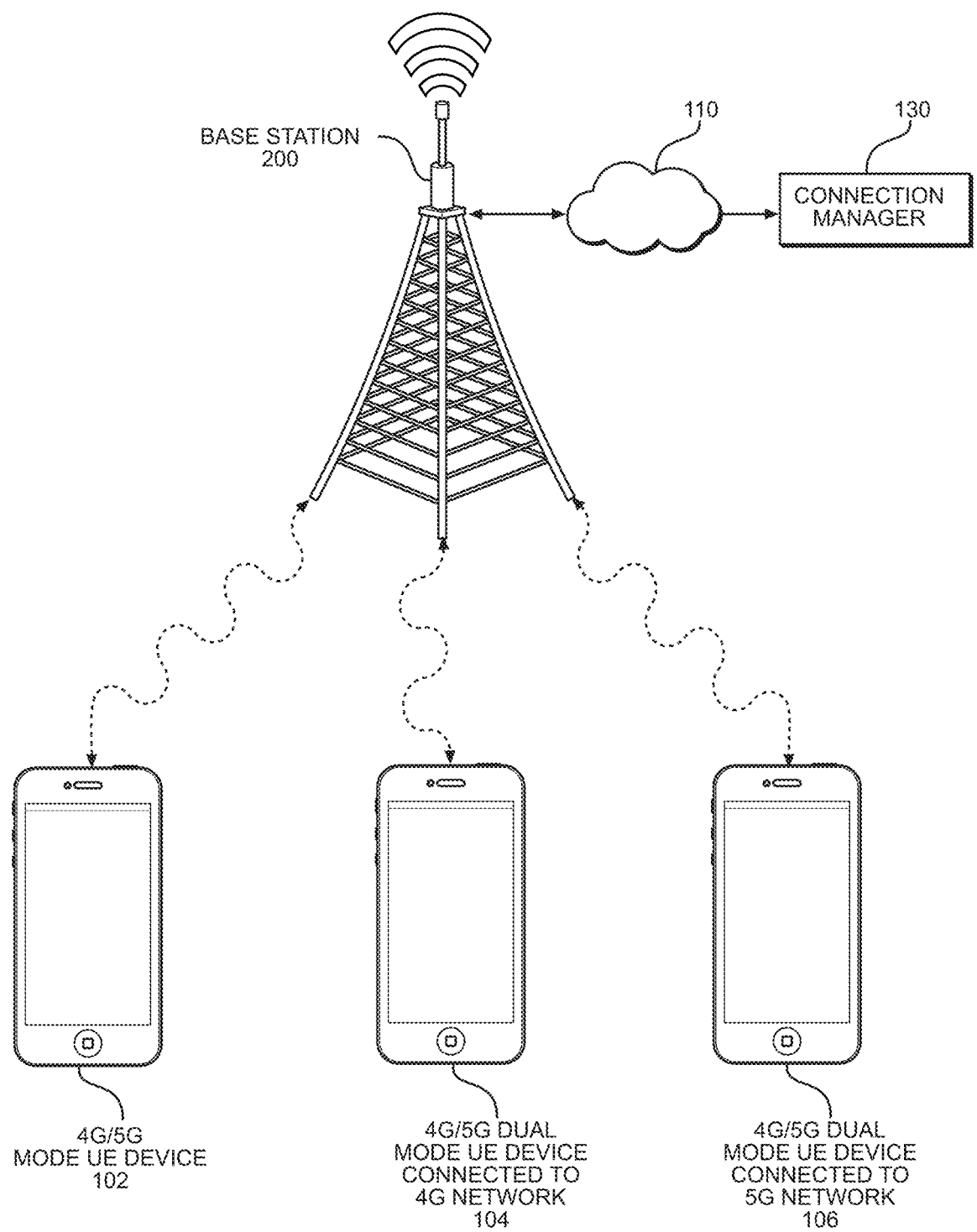
FIG. 1A illustrates a wireless communication system according to at least one example embodiment.

Various example embodiments will now be described more fully with reference to the accompanying drawings in which some example embodiments are shown.

Detailed example embodiments are disclosed herein. However, specific structural and functional details disclosed herein are merely representative for purposes of describing the example embodiments. The example embodiments, however, may be embodied in many alternate forms and should not be construed as limited to only the example embodiments set forth herein.

It will be understood that, although the terms first, second, etc. may be used herein to describe various elements, these elements should not be limited by these terms. These terms are only used to distinguish one element from another. For example, a first element could be termed a second element, and, similarly, a second element could be termed a first element, without departing from the scope of example embodiments of the present invention. As used herein, the term "and/or," includes any and all combinations of one or more of the associated listed items.

It will be understood that when an element is referred to as being "connected," or "coupled," to another element, it can be directly connected or coupled to the other element or intervening elements may be present. In contrast, when an element is referred to as being "directly connected," or "directly coupled," to another element, there are no intervening elements present. Other words used to describe the relationship between elements should be interpreted in a like fashion (e.g., "between," versus "directly between," "adjacent," versus "directly adjacent," etc.).

The terminology used herein is for the purpose of describing particular embodiments only and is not intended to be limiting of example embodiments of the invention. As used herein, the singular forms "a," "an," and "the," are intended to include the plural forms as well, unless the context clearly indicates otherwise. It will be further understood that the terms "comprises," "comprising," "includes," and/or "including," when used herein, specify the presence of stated features, integers, steps, operations, elements, and/or components, but do not preclude the presence or addition of one or more other features, integers, steps, operations, elements, components, and/or groups thereof.

It should also be noted that in some alternative implementations, the functions/acts noted may occur out of the order noted in the figures. For example, two figures shown in succession may in fact be executed substantially concurrently or may sometimes be executed in the reverse order, depending upon the functionality/acts involved.

Specific details are provided in the following description to provide a thorough understanding of the example embodiments. However, it will be understood by one of ordinary skill in the art that example embodiments may be practiced without these specific details. For example, systems may be shown in block diagrams in order not to obscure the example embodiments in unnecessary detail. In other instances, well-known processes, structures and techniques may be shown without unnecessary detail in order to avoid obscuring example embodiments.

Also, it is noted that example embodiments may be described as a process depicted as a flowchart, a flow diagram, a data flow diagram, a structure diagram, or a block diagram. Although a flowchart may describe the operations as a sequential process, many of the operations may be performed in parallel, concurrently or simultaneously. In addition, the order of the operations may be re-arranged. A process may be terminated when its operations are completed, but may also have additional steps not included in the figure. A process may correspond to a method, a function, a procedure, a subroutine, a subprogram, etc. When a process corresponds to a function, its termination may correspond to a return of the function to the calling function or the main function.

Moreover, as disclosed herein, the term "memory" may represent one or more devices for storing data, including random access memory (RAM), magnetic RAM, core memory, and/or other machine readable mediums for storing information. The term "storage medium" may represent one or more devices for storing data, including read only memory (ROM), random access memory (RAM), magnetic RAM, core memory, magnetic disk storage mediums, optical storage mediums, flash memory devices and/or other machine readable mediums for storing information. The term "computer-readable medium" may include, but is not limited to, portable or fixed storage devices, optical storage devices, wireless channels, and various other mediums capable of storing, containing or carrying instruction(s) and/or data.

Furthermore, example embodiments may be implemented by hardware, software, firmware, middleware, microcode, hardware description languages, or any combination thereof. When implemented in software, firmware, middleware or microcode, the program code or code segments to perform the necessary tasks may be stored in a machine or computer readable medium such as a storage medium. A processor(s) may perform the necessary tasks.

A code segment may represent a procedure, a function, a subprogram, a program, a routine, a subroutine, a module, a software package, a class, or any combination of instructions, data structures, or program statements. A code segment may be coupled to another code segment or a hardware circuit by passing and/or receiving information, data, arguments, parameters, or memory contents. Information, arguments, parameters, data, etc. may be passed, forwarded, or transmitted via any suitable means including memory sharing, message passing, token passing, network transmission, etc.

Example embodiments are discussed herein as being implemented in a suitable computing environment. Although not required, example embodiments will be described in the general context of computer-executable instructions, such as program modules or functional processes, being executed by one or more computer processors or CPUs. Generally, program modules or functional processes include routines, programs, objects, components, data structures, etc. that performs particular tasks or implement particular data types. The program modules and functional processes discussed herein may be implemented using existing hardware in existing communication networks. For example, program modules and functional processes discussed herein may be implemented using existing hardware at existing network elements or control nodes. Such existing hardware may include one or more digital signal processors (DSPs), application-specific-integrated-circuits (ASICs), field programmable gate arrays (FPGAs) computers or the like.

At least one example embodiment refers to a network system capable of providing dynamic co-existent service to devices of a plurality of radio technologies, on an existing cellular network using the same carrier radio resources for the plurality of radio technologies. For example, at least one example embodiment discloses a network system capable of providing co-existent service to both 4G LTE devices and 5G NR devices using the same and/or overlapping radio spectrum assigned to the 4G LTE network and the 5G NR network by the cellular network operator, but the example embodiments are not limited thereto.

Figure 1B:
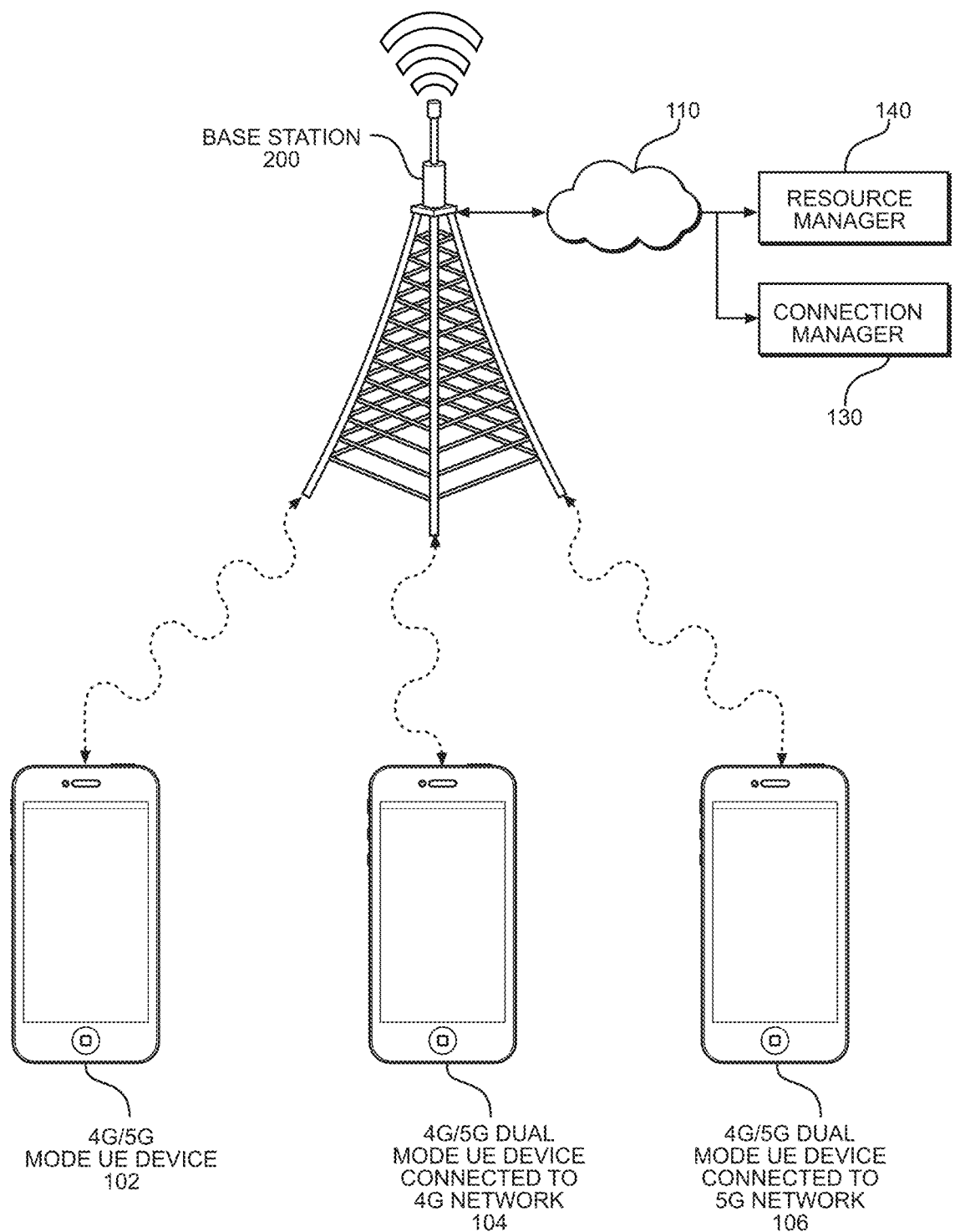
FIG. 1B illustrates another wireless communication system according at least one example embodiment.

FIG. 1A illustrates a wireless communication system according to at least one example embodiment. FIG. 1B illustrates another wireless communication system according at least one example embodiment. As shown in FIG. 1A, a wireless communication system includes a plurality of user equipment devices (UEs or UE devices) 102, 104, and 106, at least one base station (BS) 200, a cloud network 110, and/or a connection manager 130, but the example embodiments are not limited thereto. The UEs 102, 104, and 106, and the BS 200 may be connected over a wireless network, such as a cellular wireless radio access network (e.g., a 4G-Long Term Evolution (LTE) network, a 5G-New Radio (e.g., 5G) wireless network, a 6G wireless network, etc.). The BS 200 may connect to the cloud network 110 over a wired and/or wireless network.

Each of the UEs 102, 104, and 106 may be any one of, but not limited to, a mobile device, a tablet, a laptop computer, a wearable device, an Internet of Things (IoT) device, a desktop computer and/or any other type of stationary or portable device capable of operating according to the 4G LTE communication standard, the 5G NR communication standard, a future communication standard, such as a 6G standard, etc. For example, the UE 102 may be a legacy 4G device that is connected to the BS 200 over a 4G connection, the UE 104 may be a dual-mode 4G/5G device (e.g., a device that supports both 4G LTE communications and 5G NR communications) that is connected to the BS 200 on a 4G connection, and the UE 106 may be a dual-mode 4G/5G device that is connected to the BS 200 on a 5G connection.

While FIG. 1 only illustrates three UEs, 102, 104, and 106, the number of UEs in the communication system 100 is not limited thereto, and may include any number of UEs that are the same or different from the UEs 102, 104, and 106, as described above. Additionally, while FIG. 1 only illustrates a single BS 200, the number of BSs in the communication system 100 is not limited thereto and may include any number of BSs that are the same or different from the BS 200.

The wireless communication system further includes one or more base stations, such as BS 200. The BS 200 may operate according to an underlying cellular network communications protocol, such as a first radio access network (RAN) protocol, the 4G LTE communication protocol, and/or the 5G NR LTE communication protocol, etc. For example, the BS 200 may include a master node (MN) operating as a LTE cell (not shown), and a secondary node (SN) operating as a NR cell, or in other words, the BS 200 may include a plurality of radio access networks (RAN) for a plurality of cellular networks operated by the BS, such as a first RAN for the 4G network, a second RAN for the 5G network, a third RAN for a future 6G network, etc. However, the example embodiments are not limited thereto, and there may be, for example, a plurality of co-located separate BSs, such as a first BS operating as a LTE cell and a second BS operating as a NR cell, etc., that serve the same and/or substantially similar geographic area, and/or a plurality of non-co-located separate BSs that operate different RANs, etc.

The BS 200 may be connected to a connection manager 130 via a cloud network 110 (and/or a backend network, etc.). The connection manager 130 may manage and/or control which communication protocol is used by the UEs 102, 104, and/or 106 to connect to the BS 200. According to at least one example embodiment, the connection manager 130 may operate on a layer higher than the physical layer, such as the Radio Resource Control (RRC) layer, network layer, MAC layer, etc. The connection manager 130 will be discussed in further detail in connection with FIGS. 2A and 2B. According to some example embodiments, the connection manager 130 may be a processing device, a software module executed on a specialized Centralized Radio Access Network (C-RAN), data center hardware (virtualized RAN), an add-in card for a BS, a server (not shown) operating on the backend network 110 of the cellular network, etc. However, the example embodiments are not limited thereto, and the connection manager 130 may be incorporated into various network devices on the cellular network, such as the BS 200, access points, switches, routers, nodes, servers, etc.

Referring now to FIG. 1B, according to some example embodiments, the cellular wireless network system may additionally include a resource manager 140 connected to the cloud network 110. The resource manager 140 may manage and/or allocate resources associated with the carrier frequencies operated by the BS 200 in order to enable the co-existence of the 4G connections and the 5G connections of the UEs 102, 104, and 106, etc. The resource manager 140 will be discussed in further detail in connection with FIGS. 2A and 2B. According to some example embodiments, the resource manager 140 may be a processing device, a software module executed on a specialized Centralized Radio Access Network (C-RAN), data center hardware (virtualized RAN), an add-in card for a BS, a server (not shown) operating on the backend network 110 of the cellular network, etc. Additionally, according to some example embodiments, the resource manager 140 and the connection manager 130 may be integrated into a single entity. However, the example embodiments are not limited thereto, and the resource manager 140 may be incorporated into various network devices on the cellular network, such as the BS 200, access points, switches, routers, nodes, servers, etc.

While certain components of the cellular wireless network are shown as part of the wireless communication system of FIGS. 1A and 1B, the example embodiments are not limited thereto, and the cellar wireless network may include components other than that shown in FIGS. 1A and 1B, which are necessary and/or beneficial for operation of the underlying networks within the communication system 100, such as access points, switches, routers, nodes, servers, etc.

Figure 2A:
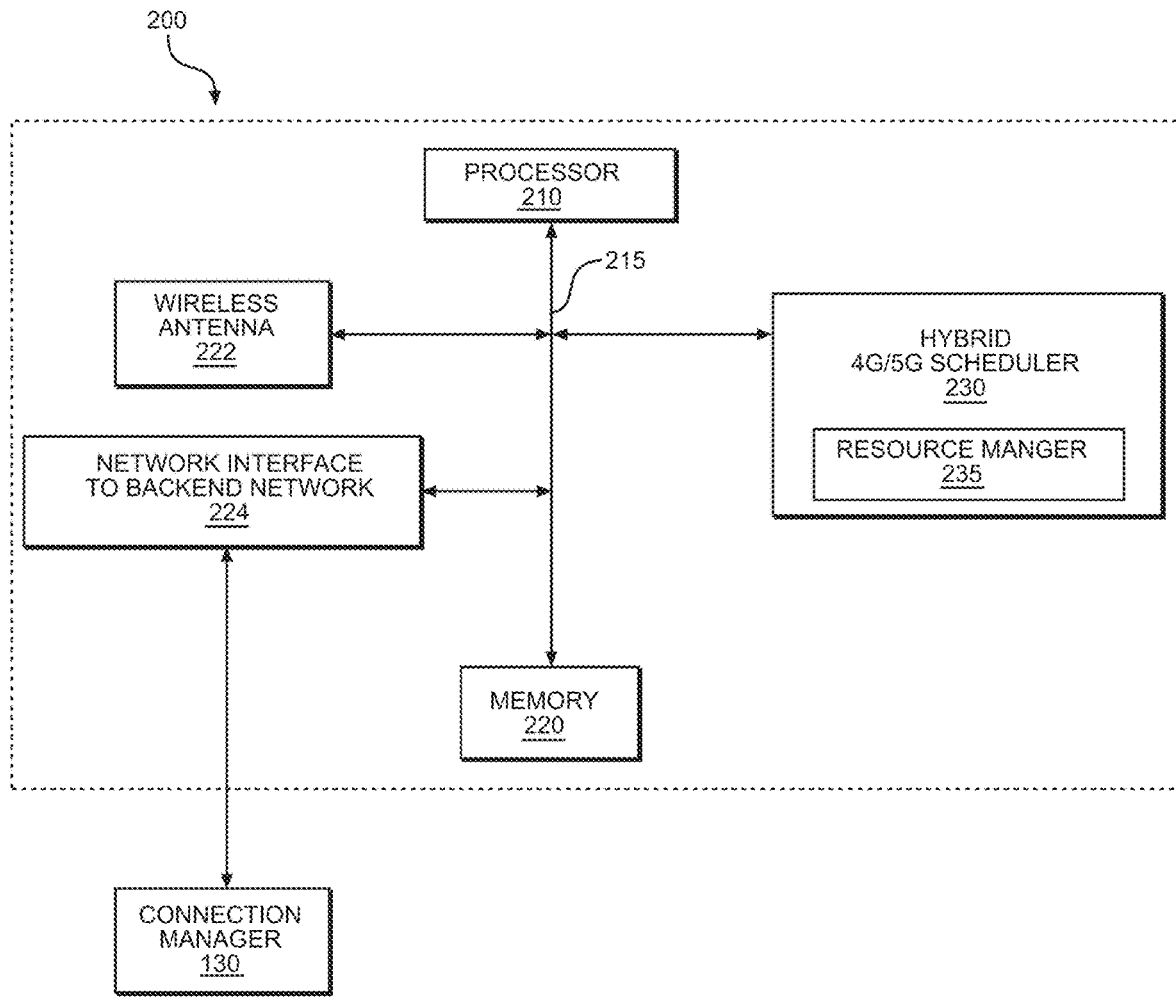
FIG. 2A is a block diagram illustrating a base station associated with the system of FIG. 1A according to at least one example embodiment.

FIG. 2A is a block diagram illustrating a base station associated with the system of FIG. 1A according to at least one example embodiment. The base station may be the base station 200 of FIG. 1A, but the example embodiments are not limited thereto.

According to at least one example embodiment, there may be several techniques for sharing a carrier (and/or subbands of the carrier, etc.) used by a cellular network operator to operate a 4G LTE network with a 5G New Radio network. One example of such a 4G/5G coexistence technique would be for the cellular radio network operators to share slots (e.g., time slots, etc.) of a 4G LTE radio frame between 4G LTE subframes and 5G NR subframes, etc. According to at least one example embodiment, a 4G LTE frame is configured for a mix of normal subframes and eMBMS subframes, and the eMBMS subframes may be used for the 5G NR subframes. With the gradual deployment of more and more 5G-enabled devices, there will be a transition period that requires a coexistence of legacy 4G devices and new 5G devices that will provide wireless service in the shared carrier. The 5G devices will be multi-mode devices that can connect to both 4G networks and 5G networks and the new 5G devices will first establish a 4G LTE connection with a BS, and then subsequently switchover to a 5G NR connection. However, the example embodiments are not limited thereto, and other methods of sharing 4G LTE carriers with 5G NR carriers may be implemented for use with the example embodiments.

Referring to FIG. 2A, a base station 200 may include at least one processor 210, a communication bus 215, a memory 220, and/or a hybrid 4G/5G scheduler 230, but the example embodiments are not limited thereto. The memory 220 may include various program code including computer executable instructions. The BS 200 may also include at least one wireless antenna 222, and/or at least one network interface 224, but is not limited thereto.

In at least one example embodiment, the at least one processor 210 may be at least one processor (and/or processor cores, distributed processors, networked processors, etc.), which may be configured to control one or more elements of the BS 200. The at least one processor 210 is configured to execute processes by retrieving program code (e.g., computer readable instructions) and data from the memory 220 to process them, thereby executing special purpose control and functions of the entire BS 200. Once the special purpose program instructions are loaded into the at least one processor 210, the at least one processor 210 executes the special purpose program instructions, thereby transforming the at least one processor 210 into a special purpose processor.

In at least one example embodiment, the memory 220 may be a non-transitory computer-readable storage medium and may include a random access memory (RAM), a read only memory (ROM), and/or a permanent mass storage device such as a disk drive, or a solid state drive. Stored in the memory 220 is program code (i.e., computer readable instructions) related to operating the hybrid 4G/5G scheduler 230, the wireless antenna 222, and/or the network interface 224, etc. Such software elements may be loaded from a non-transitory computer-readable storage medium independent of the memory 220, using a drive mechanism (not shown) connected to the BS 200, or via the wireless antenna 222 and/or network interface 224.

In at least one example embodiment, the communication bus 215 may enable communication and data transmission to be performed between elements of the BS 200. The bus 215 may be implemented using a high-speed serial bus, a parallel bus, and/or any other appropriate communication technology.

The BS 200 may also include a hybrid scheduler 230 (e.g., a hybrid 4G/5G scheduler, a fully integrated 4G/5G scheduler, a combined 4G/5G scheduler, a hybrid 5G/6G scheduler, etc.). The hybrid scheduler 230 may be a separate processing device (e.g., a separate processor, a system on chip (SoC), an application specific integrated circuit (ASIC), field programmable gate array (FPGA), etc.) installed on the BS, and/or may be a functional representation of special purpose program code executed by the at least one processor 210 of the BS. The hybrid scheduler 230 may integrate the functionality of a 4G scheduler (e.g., a first RAN scheduler corresponding to a 4G network protocol, a packet scheduler, a MAC layer scheduler, etc., for scheduling resource blocks for 4G UE devices) and a 5G scheduler (e.g., a second RAN scheduler corresponding to a 5G network protocol, a scheduler for scheduling resource blocks for 5G UE devices, etc.), as well as a resource manager 235, etc. However, the example embodiments are not limited thereto, and for example, the scheduler may correspond to other radio access network protocols besides 4G and 5G networks, such as a future 6G RAN, etc. Additionally, according to other example embodiments, the BS may include support two or more RANs, such as a 4G RAN, a 5G RAN, a 6G RAN, etc., and the hybrid scheduler may be configured to schedule resource blocks for the plurality of RANs.

In a standard 4G network, a 4G scheduler provides allocation of time-frequency resources of a carrier (e.g., resource blocks with time and frequency dimensions) based on operation on the time domain (e.g., time division duplexing) and the frequency domain (e.g., frequency division duplexing). In the time domain context, a BS will allocate a carrier (or subbands of the carrier) to one or more UEs connected to the BS during designated upload (e.g., uplink) time periods and designated download (e.g., downlink) time periods. When there are multiple UEs connected to the BS, the carrier is shared in time such that each UE is scheduled by the scheduler, and the scheduler allocates each UE with their own uplink time and/or downlink time. In the frequency domain context, the BS will allocate separate frequency subbands of the carrier to UEs simultaneously served by the BS, for uplink and/or downlink transmissions. Data transmission between the UE and the BS may occur on a radio frame basis in both the time domain and frequency domain contexts. For the 4G LTE protocol, the radio frame has a length of 10 ms. In the time domain, the 4G LTE protocol sets ten subframes (e.g., each subframe having a length of 1 ms) for each LTE radio frame, and each LTE subframe includes two slots. In the frequency domain, the 4G LTE protocol divides the carrier into blocks of twelve adjacent subcarriers (e.g., 15 kHz subcarrier spacing, etc.). The minimum resource unit for allocation and/or assignment by the scheduler to a particular UE device, i.e. a resource block, corresponds to a specific downlink/uplink time slot (e.g., one subframe, etc.) and/or a specific downlink/uplink frequency subband (e.g., twelve adjacent subcarriers, etc.).

For the sake of clarity and consistency, the example embodiments will be described as using the time domain, but the example embodiments are not limited thereto and the example embodiments may operate in the frequency domain.

Referring again to FIG. 2A, the hybrid scheduler 230 may include a resource manager module 235 that controls the resource allocation of a current radio frame on a subframe-by-subframe basis. In other words, the resource manager 235 may determine whether to allocate each subframe of the radio frame as either a 4G LTE subframe or a 5G NR subframe. According to at least one example embodiment, the resource manager 235 may advantageously make the resource allocation determination based on instantaneous and/or near-instantaneous channel state information related to the 4G channel(s) and/or the 5G channel(s) detected by the BS 200, thereby allowing the hybrid scheduler 230 to efficiently and fairly schedule the resource blocks between the 4G UE devices and the 5G UE devices on a slot-by-slot and/or subframe-by-subframe basis. Additionally, the resource manager 235 may also make the resource allocation determination based on other network information obtained by the hybrid scheduler 230, such as the number of active 4G connections, the number of active 5G connections, the current transmission buffer status of each UE device served by the BS 200, etc., and/or proportional fair score considerations, etc., but the example embodiments are not limited thereto. For example, in at least one other example embodiment, the resource manager 235 may not be integrated into the hybrid scheduler 230, but rather may have a close and/or fast network connection to the hybrid scheduler 230, that enables the hybrid scheduler 230 and the resource manager 235 to exchange instantaneous and/or near-instantaneous channel state information with the hybrid scheduler 230.

Once the resource manager 235 assigns the subframe as either a 4G LTE subframe or a 5G NR subframe, the hybrid scheduler 230 then allocates the resource blocks associated with the subframe to the one or more UEs connected to the BS 200 of the appropriate connection type. For example, if the resource manager 235 allocates a first subframe as a 4G subframe, the hybrid scheduler 230 may schedule each individual resource block of the first subframe to the one or more UEs connected to the 4G cell (not shown) of the BS 200 (e.g., the UEs connected to the BS 200 using a 4G connection). As another example, if the resource manager 235 allocates a second subframe as a 5G subframe, the hybrid scheduler 230 may schedule each individual resource block of the second subframe to the one or more UEs connected to the 5G cell (not shown) of the BS 200 (e.g., the UEs connected to the BS 200 using a 5G connection).

The BS 200 may also include a wireless antenna 222 and/or a network interface 224. The wireless antenna 222 may include an associated radio unit (not shown) and may be used to transmit the 4G LTE wireless and/or 5G NR wireless signals to at least one UE device, such as UEs 102, 104, and/or 106, etc. According to some example embodiments, the wireless antenna 222 may be a single antenna, or may be a plurality of antennas, etc.

Additionally, the BS 200 may determine wireless network characteristics and/or wireless network conditions associated with the connections between the at least one UE device and the BS 200 through feedback signaling from the at least one UE device and/or the detection or measurement of the level of received signal from other BSs or UE devices. For example, the wireless antenna 222 may be used to receive from the at least one UE device channel state information of the channel(s) operated by the BS 200 in the one or more radio technologies, e.g. received signal strength indicator (RSSI) associated with UEs connected to the BS 200, etc., receive signal-to-interference-plus-noise ratio (SINR), and/or interference level readings associated with the connected UEs, etc. The BS 200 may also use the wireless antenna 222 to detect the wireless network frequencies being used by other network devices in the proximity of the BS 200, such as other BSs, other radio broadcasting device, the UEs, etc.

The BS 200 may communicate with a backend network of the wireless network via a network interface 224. The network interface 224 may be a wired and/or wireless network interface and may connect the BS 200 enable the BS 200 to communicate and/or transmit data to and from to network devices on the backend network, such as a network gateway (not shown), etc., thereby allowing the UEs connected to the BS 200 to communicate and/or transmit data using the backend network to other networks, such as the Internet, telephone networks, VoIP networks, etc.

According to some example embodiments, the BS 200 may connect to a connection manager 130 using the network interface 224. The connection manager 130 may be a processing device (e.g., a separate processor, a SoC, an ASIC, etc.) located on the backend network, a software module executed on a specialized C-RAN, data center hardware (virtualized RAN), a server (not shown) operating on the backend network 110 of the cellular network, integrated into a network device, such as a router, etc., but is not limited thereto. Additionally, in some example embodiments, the connection manager 130 may be included in the BS 200, such as an add-in card for a BS, a separate processor connected to the bus 215, a software module executed by the at least one processor 210, etc.

The connection manager 130 may manage the connection type(s) of a UE device that connects to the BS 200. For example, the connection manager 130 may determine whether a UE device is capable of connecting to the wireless network on a 4G LTE connection, a 5G NR connection, and/or either a 4G LTE connection or a 5G NR connection, etc., based on signaling information transmitted by the UE device to the BS 200, and forwarded from the BS 200 to the connection manager 130, upon the initial request for connection of the UE device to the BS 200. For example, if the UE device is initially connected to the BS 200 using a 4G connection, the connection manager may determine whether to change the UE device's connection from the 4G connection to a 5G connection based on network considerations, or vice versa, etc. Once the connection manager's determination has been made, the connection manager may transmit a connection mode instruction (e.g., an enable/disable 5G instruction, a changeover instruction, etc.) to the UE that instructs the UE to enable a second connection-type, such as a 5G connection, a 6G connection, in addition to the UE's initial and/or default connection (e.g., a 4G connection, etc.). In at least one example embodiment, the connection manager 130 may instruct the UE to change its connection type, e.g., change its connection type from the initial connection type to a new (faster) connection type (e.g., disable its 4G connection and enable a 5G connection, etc.). The connection manager 130 will be discussed in further detail in connection with FIG. 4.

While FIG. 2A depicts an example embodiment of a BS 200, the BS is not limited thereto, and may include additional and/or alternative architectures that may be suitable for the purposes demonstrated.

Figure 2B:
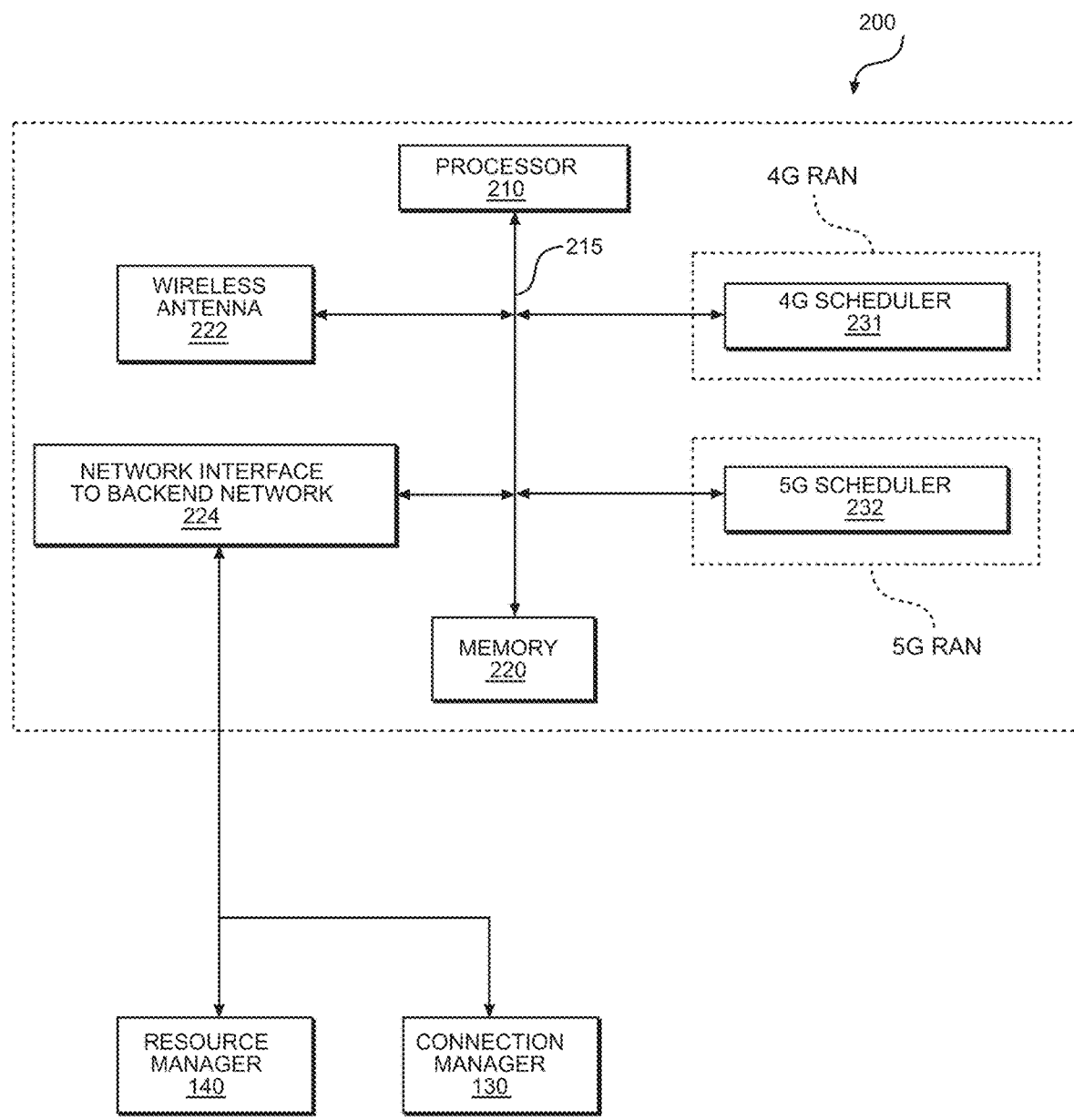
FIG. 2B is a block diagram illustrating a base station associated with the system of FIG. 1B according to at least one example embodiment.

FIG. 2B is a block diagram illustrating a base station associated with the system of FIG. 1B according to at least one example embodiment. Description of like components will be omitted for the sake of brevity.

Referring to FIG. 2B, the BS 200 may include separate 4G scheduler 231 and 5G scheduler 232, and/or may be a first BS including the 4G scheduler 231 and a second BS including the 5G scheduler 232, etc. The 4G scheduler 231 and the 5G scheduler 232 may be separate processing devices installed on the BS 200 (e.g., the schedulers may be different processor cards installed on the chassis of the BS 200, etc.), and/or may be a functional representation of special purpose program code executed by the at least one processor 210 of the BS. The 4G scheduler may receive resource allocation information from the resource manager 140 over the backend network via the network interface 224, the resource allocation information indicating the slots and/or resource blocks allocated to 4G connections and 5G connections for a future resource window (e.g., a desired number of slots, a desired number of subframes, a desired number of subbands, and/or a desired number of resource blocks, etc.) and based on the resource allocation information related to the resource blocks allocated to 4G connections, may schedule the 4G resource blocks to the one or more UE devices using 4G connections served by the BS 200. Similarly, the 5G scheduler may also receive the resource allocation information from the resource manager 140, and based on the resource allocation information related to the 5G resource blocks, the 5G scheduler may schedule the 5G resource blocks to the one or more UE devices using the 5G connections served by the BS 200. However, the example embodiments are not limited thereto, and for example, the scheduler may correspond to other radio access network protocols besides 4G and 5G networks, such as a future 6G RAN, etc. Additionally, according to other example embodiments, the BS may include support two or more RANs, such as a 4G RAN, a 5G RAN, a 6G RAN, etc., and the BS may include a plurality of schedulers that may each be respectively configured to schedule resource blocks for a corresponding RAN of the plurality of RANs.

One of the possible advantages of example embodiments including a separate 4G scheduler 231 and a separate 5G scheduler 232 is that these example embodiments may easily and cost-effectively be applied to existing BSs that support 4G LTE communications because the hardware design, functionality, and/or programming of the existing 4G scheduler would not have to be modified to accommodate 5G NR operation. Instead, a separate 5G scheduler to manage 5G connections from 5G-ready UE devices may be installed in the 4G-BS to enable 5G NR operation. Alternatively, according to some example embodiments, the 5G scheduler 232 may be installed in a separate BS from the BS including the 4G scheduler, and thereby UEs in the geographical proximity of the two BSs may be served by the 4G network and the 5G network simultaneously, etc.

According to some example embodiments, the resource manager 140 may be a processing device (e.g., a separate processor, a SoC, an ASIC, a FPGA, etc.) located on the backend network, a software module executed on a specialized C-RAN, data center hardware (virtualized RAN), a server (not shown) operating on the backend network 110 of the cellular network, integrated into a network device, such as a router, etc., but is not limited thereto. In at least one example embodiment, the resource manager 140 may be integrated with the connection manager 130, but the example embodiments are not limited thereto. Similar to the resource manager 235 of FIG. 2A, the resource manager 140 may manage the resource allocation of resource blocks between the 4G connections and the 5G connections of the BS 200. However, according to some example embodiments, the resource manager 140 does not receive instantaneous and/or near-instantaneous channel state information related to the 4G channel(s) and 5G channel(s) operated by the BS 200. Consequently, the resource manager 140 manages the resource blocks of the BS 200 over a resource window (e.g., a slot window, a subband window, etc.), which includes a desired number of time slots, subbands, and/or resource blocks (e.g., 50 subframes, 500 subframes, etc.) over a period of time (e.g., 100 ms, 1000 ms, etc.).

The resource manager 140 may determine the number of resource blocks of the resource window to allocate to 4G connections, and determine the number of resource blocks of the resource window to allocate to 5G connections, and transmit the allocation determination results as resource allocation information to the 4G scheduler 231 and/or the 5G scheduler 232 on the BS 200. The resource manager 140 may make the resource allocation determination based on network condition information transmitted by the 4G scheduler 231 and/or the 5G scheduler 232 and/or based on proportional fair score considerations associated with the 4G and 5G UE devices. For example, the network information may include the number of active 4G connections at the BS 200, the number of active 5G connections at the BS 200, an aggregate proportional fair score information calculated by the 4G scheduler and/or the 5G scheduler, the proportional fair score information corresponding to the ratio of the estimated feasible rate if the carrier was allocated to the UE device to the historic or average UE device rate, the amount of resources assigned to and/or utilized by each of the UEs connected to the BS 200, other scheduling metric information obtained and/or calculated by the 4G and/or the 5G schedulers, the actual and/or estimated transmission buffer statuses for the UEs connected to the BS 200, etc. The network information may be historical information, or in other words, the network information may correspond to at least one previous resource window, and the resource manager 140 may use the network information related to the at least one previous resource window to allocate the 4G resource blocks and the 5G resource blocks of at least one future resource window.

Additionally, according to at least one example embodiment, the resource manager 140 may receive no channel state information from the 4G scheduler 231 and/or the 5G scheduler 232, and may instead determine the resource allocation information based on only the number of active connections (actual or estimated number connections) at the BS 200. For example, the resource manager 140 may receive the number of active connection information (e.g., the number of active 4G connections and the number of active 5G connections) from the connection manager 130 (e.g., via the RRC layer, etc.), or may estimate the number of active connections (e.g., the number of active 4G connections and the number of active 5G connections) based on information obtained from other network devices on the wireless network. For example, an average of the number of active connections over a previous resource window may be estimated by the resource manager 140 based on determining when each connection of the previous resource window became active, estimating an average transmission payload for each active connection, determining the number of bits transferred by each active connection during the previous resource window, and then estimating whether the connection will still be active in the next resource window based on whether the number of bits transferred equals the estimated transmission payload for the active connection, etc. Once the number of active 4G connections and 5G connections has been obtained, the resource manager 140 may allocate the resource blocks of the next resource window between the 4G connections and the 5G connections. For example, the resource manager 140 may proportionally allocate the resource blocks based on the proportion of active 4G connections vs. active 5G connections (e.g., if the number of 4G connections is 40% of the total number of active connections, and the number of active 5G connections is 60%, allocate 40% of the resource blocks of the next resource window to 4G connections and 60% of the resource blocks to the 5G connections, etc.). Additionally, according to some example embodiments, the resource manager 140 may allocate the resource blocks based on the utility achieved by the 4G connections and/or the 5G connections and/or proportional fair score considerations. For example, the resource manager 140 may allocate the shared resource blocks between 4G connections and 5G connections to optimize and/or increase the overall geometric mean user throughput across the 4G and 5G connections based on the estimated transmission payload information and active connection times of the 4G and 5G UE devices and/or based on aggregate proportional fair score information calculated based on the estimates of the 4G connections and the estimates of the 5G connections, the aggregate proportional fair score information corresponding to, e.g., the average maximum proportional fair score among 4G connections or 5G connections calculated along a given time interval, etc., but the example embodiments are not limited thereto.

In addition to determining the number of resource blocks to allocate to the 4G scheduler 231 and the 5G scheduler 232, the resource manager 140 may also determine the ordering of the resource blocks between the two connection modes. For example, the resource manager 140 may assign the first N number of resource blocks of a resource window to the 5G scheduler 232, assign the next N number of resource blocks to the 4G scheduler 231, etc., however the example embodiments are not limited thereto, and for example, the number of resource blocks assigned to the 4G scheduler 231 and the number of resource blocks assigned to the 5G scheduler 232 may be different from each other, etc. Additionally, according to some example embodiments, the resource manager 140 may evenly interleave the assigned resource blocks between the 4G resource blocks and the 5G resource blocks, evenly space the assigned 4G resource blocks with the assigned 5G resource blocks (e.g., schedule one 5G resource block for every three 4G resource blocks, etc.), randomly schedule the assigned 4G resource blocks and the assigned 5G resource blocks, etc.

Figure 3A:
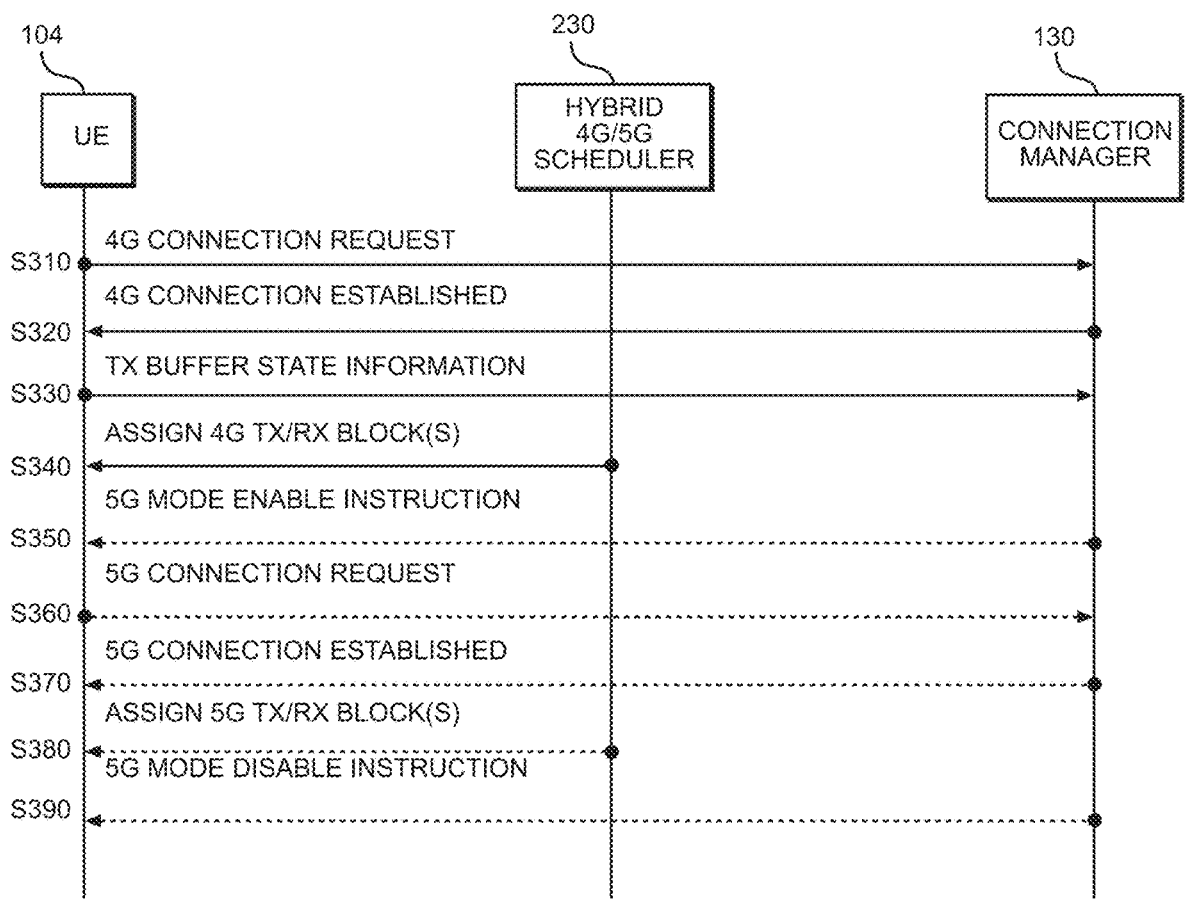
FIG. 3A illustrates a transmission flow diagram associated with the system of FIG. 1A according to at least one example embodiment.

FIG. 3A illustrates a transmission flow diagram associated with the system of FIG. 1A according to at least one example embodiment.

According to at least one example embodiment, in operation S310, a 4G/5G dual-mode UE device, such as UE 104 of FIG. 1A, etc., may initially request a connection to a BS, such as the BS 200 of FIGS. 1A and 2A, etc., over a 4G connection. The connection manager 130 may receive the 4G connection request from the UE 104, the information including information such as a unique identifier associated with the UE 104 (e.g., IMSI of the UE, MAC address information of the UE, etc.), UE capability information, etc. In operation S320, the connection manager 130 may establish a 4G connection with the UE 104. In operation S330, the UE 104 may transmit its buffer status (e.g., transmission buffer status, upload buffer status, etc.) to the connection manager 130 during an uplink transmission, e.g., the amount of data the UE 104 will be transmitting over the current connection. In operation S340, the hybrid scheduler 230 will determine whether to allocate the resource blocks in the next subframe, and/or slot, etc., to 4G or 5G, based on resource utilization information related to the 4G channels and the 5G channels operated by the BS 200, such as the buffer information related to the UE 104 that may be obtained by the hybrid scheduler 230 based on communication with the connection manager 130 and/or received from the cellular network's RRC layer using the RRC protocol, etc. The resource utilization information available to the hybrid scheduler 230 may include instantaneous and/or near-instantaneous channel state information of the corresponding 4G and 5G channels, buffer status information related to 4G UE devices and the 5G UE devices connected to the BS 200 that are managed by the connection manager 130, the respective data throughput of the 4G and 5G UE devices, 4G and 5G utilization metric information, etc.

Assuming the hybrid scheduler 230 determines that the next subframe, and/or next time slot, etc. will be assigned to 4G connections, the hybrid scheduler 230 will then transmit 4G scheduling information to the UE 104 indicating the one or more 4G resource blocks assigned to the UE 104 (and/or to other 4G UE devices connected to the BS 200).

For example, as explained in connection with FIG. 2A, the hybrid scheduler 230 may allocate each resource block and/or subframe to 4G connections or 5G connections on a resource block-by-resource block basis, or a subframe-by-subframe basis. Once the hybrid scheduler 230 determines that the next resource block, or next subframe, will be a 4G resource block, or 4G subframe, the hybrid scheduler 230 may assign the particular 4G resource block to one of the UE devices connected to the BS 200 using a 4G connection.

Optionally, in operation S350, the connection manager 130 may transmit a connection mode instruction to the UE 104 (e.g., an enable/disable 5G instruction, a 5G mode changeover instruction, a 6G mode changeover instruction, etc.), the connection mode instruction instructing the UE 104 to establish a new 5G connection with the BS 200. According to some example embodiments, the UE 104 may maintain the 4G connection, and attempt to establish a second 5G connection to the BS 200, a 6G connection to the BS 200, etc., but the example embodiments are not limited thereto, and the UE 104 may terminate the 4G connection, etc. In operation S360, in response to the connection mode instruction from the connection manager 130, the UE 104 transmits a 5G connection request to the connection manager 130. In operation S370, the connection manager 130 may establish a 5G connection with the UE 104. In operation S380, the hybrid scheduler 230 may transmit 5G scheduling information to the UE 104 indicating the one or more 5G resource blocks assigned to the UE 104.

For example, in response to the hybrid scheduler 230 determining that the next resource block, or next subframe, will be a 5G resource block, or 5G subframe, the hybrid scheduler 230 may assign the particular 5G resource block to one of the UE devices connected to the BS 200 using a 5G connection. Additionally, in the event the hybrid scheduler 230 is scheduling resource blocks on a subframe-by-subframe basis, each of the subframes including a plurality of resource blocks, the hybrid scheduler 230 may assign the plurality of 5G resource blocks for the next 5G subframe to the 5G UE devices.

According to some example embodiments, in optional operation S390, the connection manager 130 may also transmit a second transmission mode (e.g., a disable instruction, a 4G mode changeover instruction, etc.) to instruct the UE to disable the 5G connection, to a dual-mode UE that is connected to the BS 200 using a 5G connection, for example based on UE resource utilization or request, network congestion, cellular network operator de-prioritization of a UE's access to 5G network services, etc.

Figure 3B:
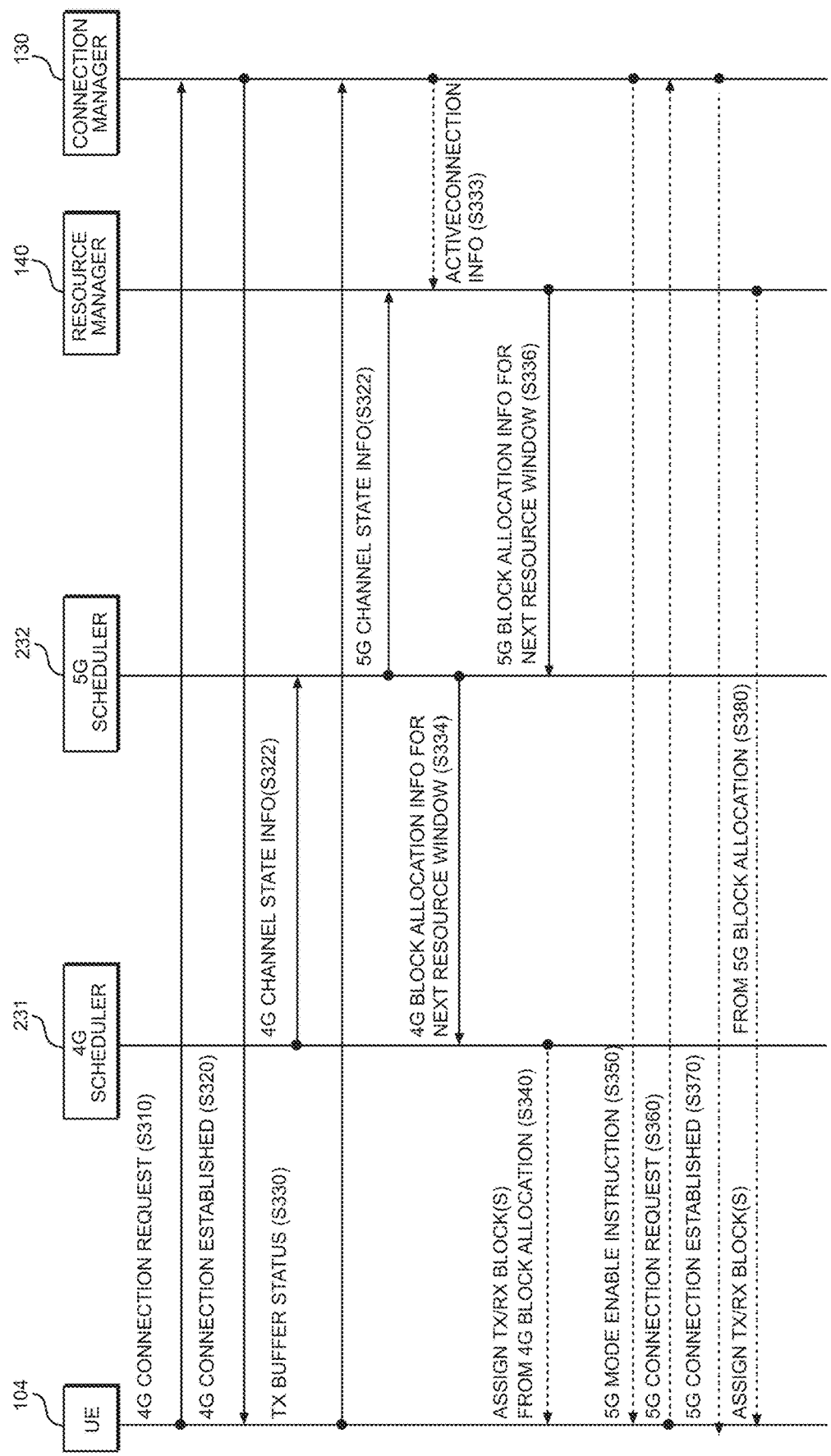
FIG. 3B illustrates a transmission flow diagram associated with the system of FIG. 1B according to at least one example embodiment.

FIG. 3B illustrates another transmission flow diagram that is associated with the system of FIG. 1B according to at least one example embodiment.

According to at least one example embodiment, in operation S310, a UE, such as UE 104, may transmit a 4G connection request to the connection manager 130, the request including information such as a unique identifier associated with the UE 104 (e.g., IMSI of the UE, MAC address information, etc.), UE capability information, etc. In operation S320, the connection manager 130 may establish a 4G connection with the UE 104. In operation S322, the 4G scheduler 231 may obtain, detect, and/or determine 4G resource utilization information related to the 4G channels operated by the BS 200. The 4G resource utilization information may include information, such as 4G channel state information, transmission buffer status information related to 4G UE devices managed by the 4G scheduler 231, 4G data throughput, 4G utilization metric information, etc. The 4G scheduler 231 may then transmit the 4G resource utilization information to the resource manager 140. According to at least one example embodiment, the 4G resource utilization information may be aggregate resource utilization information based on the connection statistics related to all of the 4G UE devices, summary statistics corresponding to the 4G UE devices, etc., but the example embodiments are not limited thereto.

In operation S330, the UE 104 may transmit its transmission buffer status, e.g., the amount of data the UE 104 will be transmitting over the current connection, to the connection manager 130. In operation S332, the 5G scheduler 232 of the BS 200 may obtain, detect, and/or determine 5G resource utilization information related to the 5G channels operated by the BS 200. The 5G resource utilization information may include information, such as 5G channel state information, transmission buffer status information related to 5G UE devices managed by the 5G scheduler, 5G data throughput, 5G utilization metric information, etc. The 5G scheduler 232 may then transmit the 5G resource utilization information to the resource manager 140. According to at least one example embodiment, the 5G resource utilization information may be aggregate resource utilization information based on the connection statistics related to all of the 5G UE devices, summary statistics corresponding to the 5G UE devices, etc., but the example embodiments are not limited thereto.

In operation S334, the resource manager 140 may determine resource allocation information based on the 4G resource utilization information and the 5G resource utilization information. The resource allocation information may include 4G resource allocation information and/or 5G resource allocation information that indicates the allocation of 4G and/or 5G resource blocks over the next resource window. In operation S334, the resource manager 140 may transmit the 4G resource allocation information to the 4G scheduler 231, and in operation S336, the resource manager 140 may transmit the 5G resource allocation information to the 5G scheduler 232.

In some example embodiments, the transmission of the 4G resource utilization information and the 5G resource utilization information (e.g., operations S322 and S332) may not occur. Instead, the resource manager 140 may determine the resource allocation information based on an actual and/or estimated number of active 4G and 5G connections determined by the connection manager 130 and transmitted to the resource manager 140 in operation S333.

In operation S340, in the event that the connection manager 130 does not issue a connection mode instruction to the UE 104, the 4G scheduler 231 will transmit 4G scheduling information to the UE 104 indicating the one or more 4G resource blocks assigned to the UE 104. Additionally, in the event the 4G scheduler 231 schedules resource blocks over a resource window including a plurality of slots and/or a plurality of subframes, etc., the resource window including a plurality of resource blocks, the 4G scheduler 231 may assign the plurality of 4G resource blocks for the next 4G resource window to the 4G UE devices connected to the BS 200, such as the UE 104.

Optionally, in operation S350, the connection manager 130 may transmit a connection mode instruction to the UE 104, the connection mode instruction instructing the UE 104 to establish a new 5G connection with the BS 200 (e.g., a 5G mode enable instruction). According to some example embodiments, the UE 104 may terminate the 4G connection, but the example embodiments are not limited thereto, and the UE 104 may maintain the 4G connection, and attempt to establish a second 5G connection to the BS 200. In operation S360, in response to the connection mode instruction from the connection manager 130, the UE 104 transmits a 5G connection request to the connection manager 130. In operation S370, the connection manager 130 may establish a 5G connection with the UE 104 via the BS 200. In operation S380, the 5G scheduler 232 may transmit 5G scheduling information to the UE 104 indicating the one or more 5G resource blocks assigned to the UE 104 over the next resource window.

Figure 4:
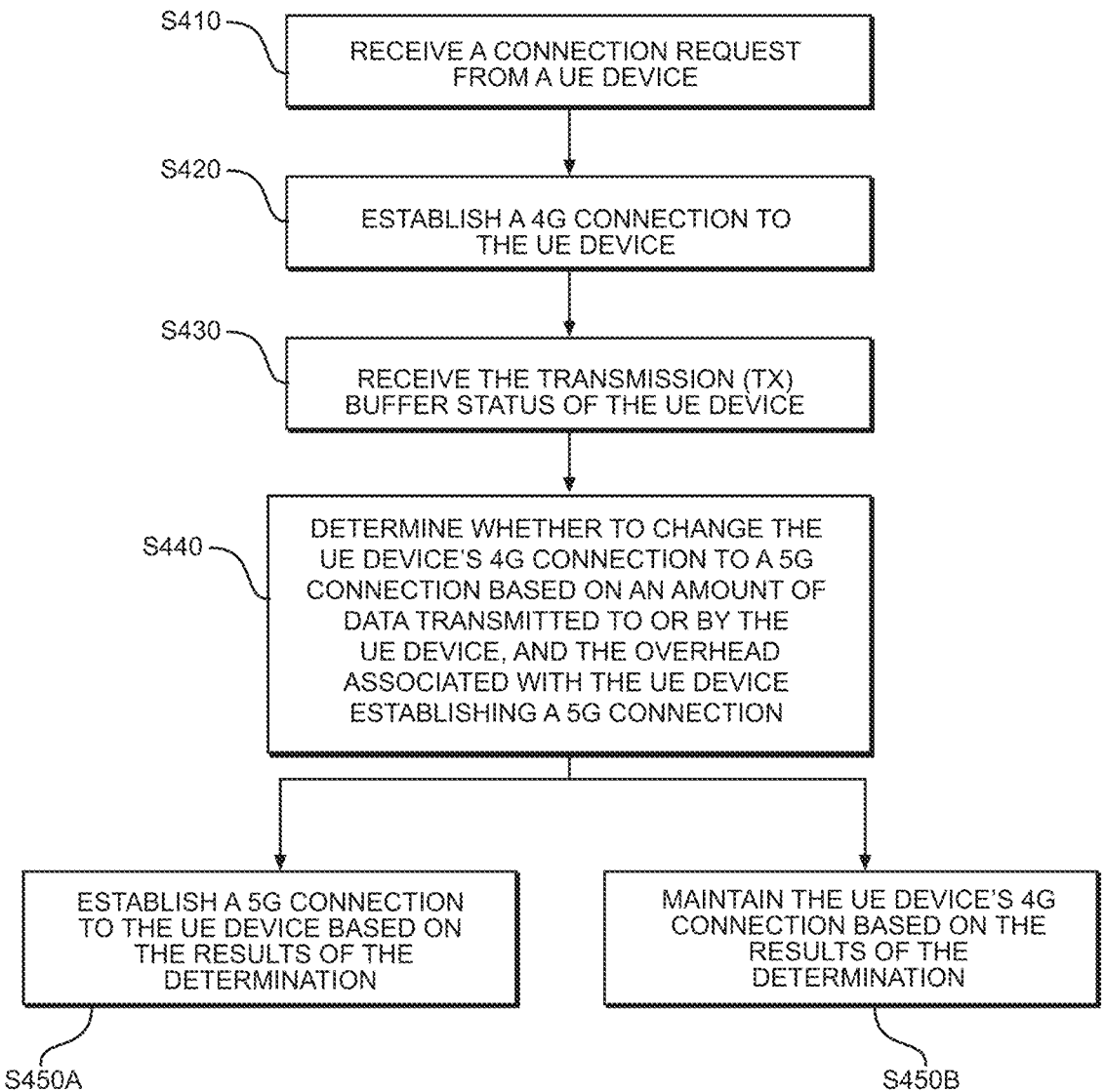
FIG. 4 is a flowchart illustrating a method for assigning a 4G/5G dual-mode UE to a 4G or 5G connection according to at least one example embodiment.

FIG. 4 is a flowchart illustrating a method for assigning a 4G/5G dual-mode UE to a 4G or 5G connection according to at least one example embodiment.

Referring to FIG. 4, a method for assigning a 4G/5G dual-mode UE to a 4G or 5G connection by a connection manager according to at least one example embodiment is shown. In operation S410, a connection manager, such as the connection manager 130 of FIGS. 1A and 1B, may receive an initial 4G connection request from a UE, such as UE 104. In operation S420, the BS 200 and the UE 104 may establish a 4G connection in response to the 4G connection request. In operation S430, the connection manager 130 may receive a transmission (TX) buffer status from the UE 104 during an uplink transmission of the UE 104, the transmission buffer status indicating the amount of data the UE 104 intends to transmit over its connection with the BS 200.

In operation S440, the connection manager 130 may determine whether to change the connection type of UE 104 from a 4G connection to a 5G connection based on a downlink buffer status and/or the received uplink buffer status, or the amount of data that has been transmitted by or to the UE 104 since the connection of the UE 104 became active, and signaling overhead for switching the connection type from the 4G connection to the 5G connection. For example, while data transmission speeds for 5G connections are higher and more efficient than data transmission speeds for 4G connections, the transferring of the 4G connection to the 5G connection will necessarily incur signaling and processing overhead. This overhead may mean that the establishment of the 5G connection and/or the changeover of the 4G connection to the 5G connection is inefficient and/or cost-ineffective unless the amount of data to be transmitted (e.g., the payload of the UE device) is sufficiently large to overcome the establishment and/or changeover overhead. Therefore, the connection manager 130 may determine whether to enable or change the connection mode of a particular UE's connection type from a 4G connection to a 5G connection by comparing the amount of data remaining to be transmitted (e.g. the buffer status information) by or to the UE 104 to a changeover overhead threshold. The connection manager 130 may also estimate the amount of data remaining to be transmitted by the amount of data that has been transmitted since the UE connection became active and proceed with the comparison to a changeover overhead threshold to determine whether to change a particular UE's connection type from a 4G connection to a 5G connection. The amount of signaling overhead and processing overhead incurred by a change in the connection mode may be based on the current network speeds being achieved on the network, based on current network conditions on the 4G and 5G networks (e.g., the proportion of the carrier devoted to 4G connections vs. 5G connections, the utilization of the 4G resources vs. the 5G resources, the number of 4G and 5G active connections, the effective data throughput rates for the 4G and 5G connections, environmental factors effecting the 4G connections and 5G connections, etc.), and may change based on the time of day, distribution of traffic flow sizes, the number of users, etc., or in other words, the changeover overhead threshold value may be dynamic, or may be static.

Based on the results of the comparison of the amount of data to be transmitted by or to the UE 104 to the changeover overhead threshold, the connection manager 130 may transmit a connection mode instruction to the UE 104 (S450A), or may maintain the current connection type of the UE 104 (S450B).

While FIG. 4 illustrates one method for assigning a 4G/5G dual-mode UE to a 4G or 5G connection by a connection manager, the example embodiments are not limited thereto, and other methods may be used to assign a 4G/5G dual-mode UE to a 4G or 5G connection by a connection manager.

Figure 5:
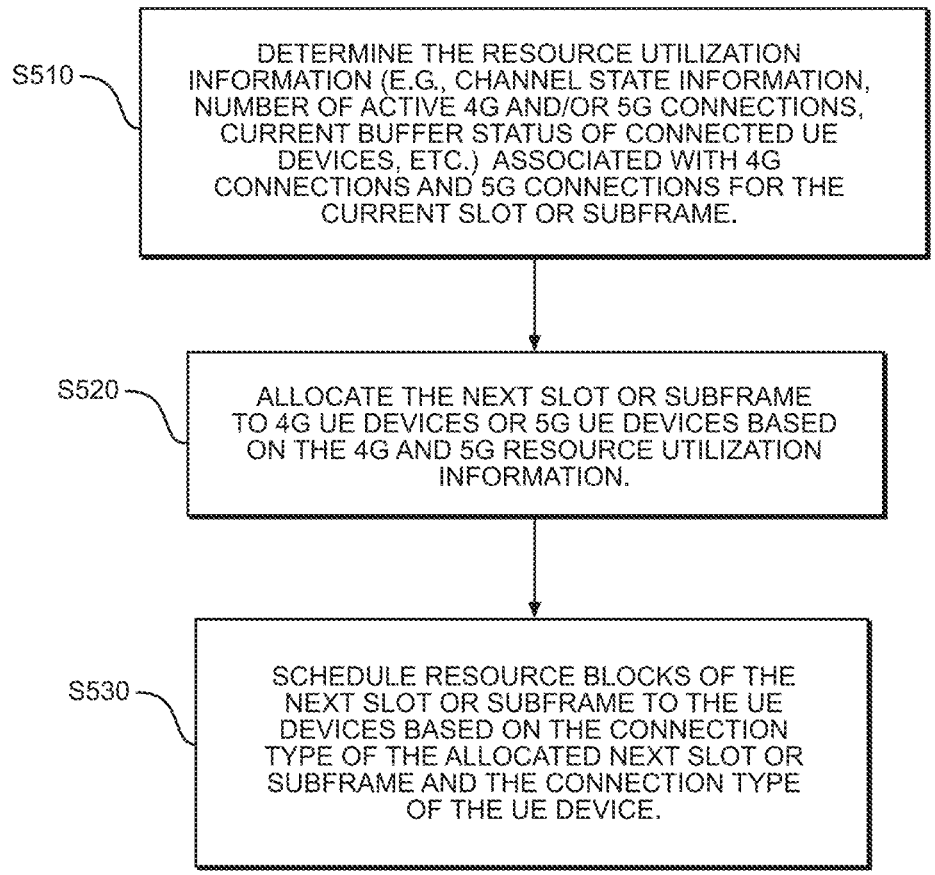
FIG. 5 is a flowchart illustrating a first method for allocating resource blocks between 4G network connections and 5G network connections according to at least one example embodiment.
Figure 6:
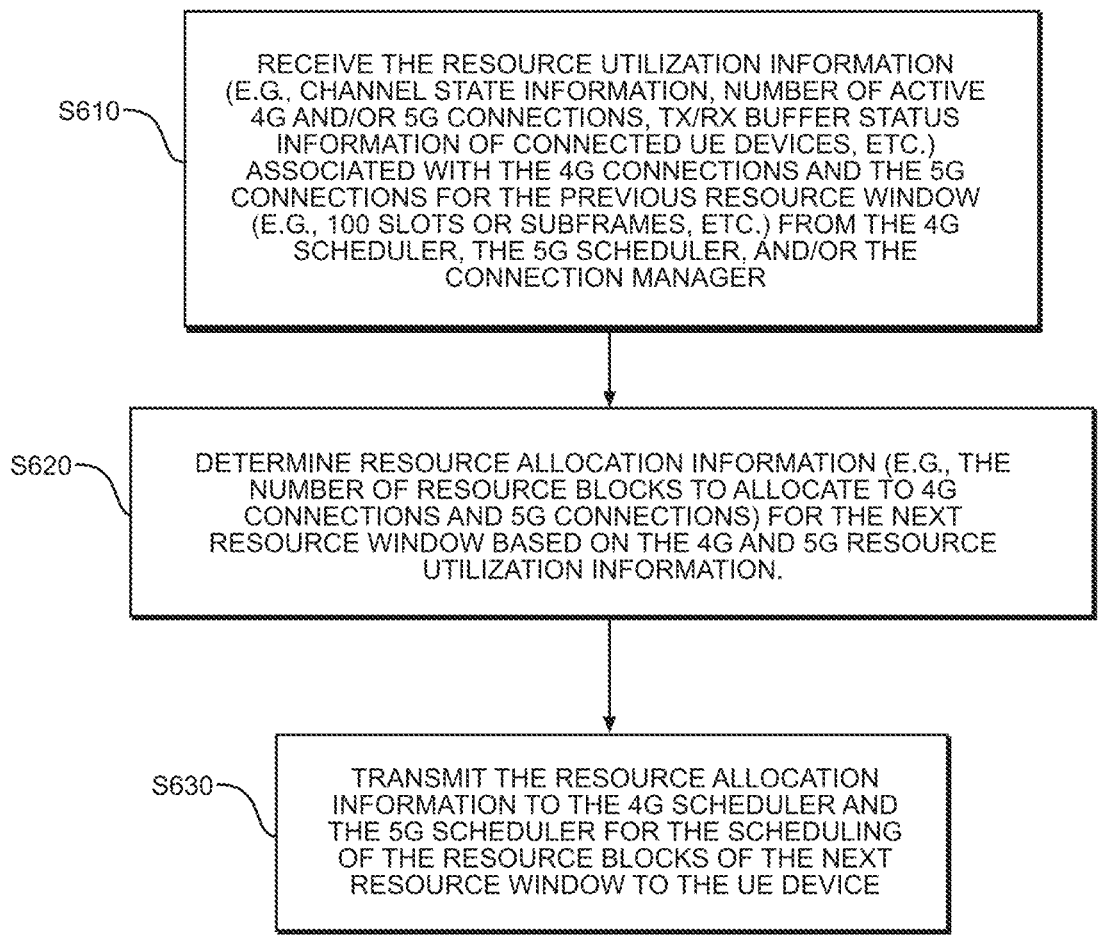
FIG. 6 is a flowchart illustrating a second method for allocating resource blocks between 4G network connections and 5G network connections according to at least one example embodiment.
Figure 7:
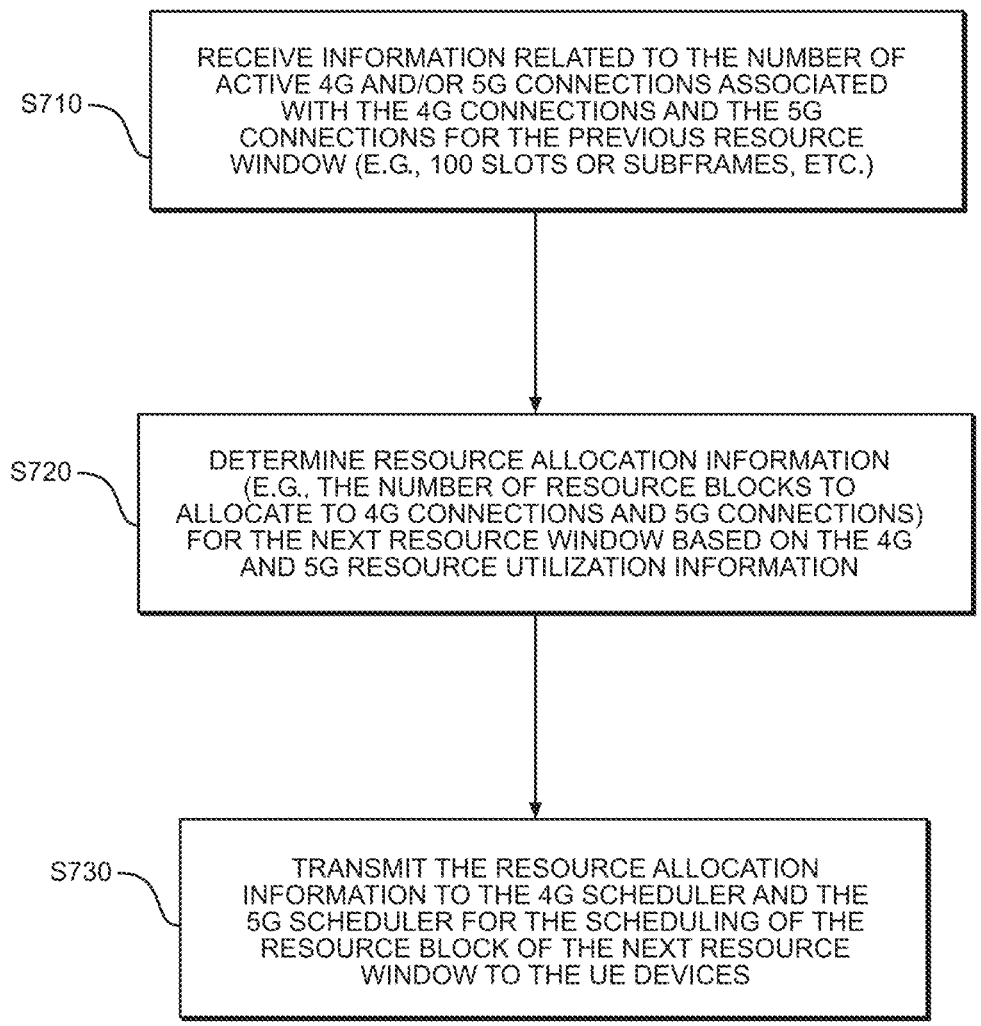
FIG. 7 is a flowchart illustrating a third method for allocating resource blocks between 4G network connections and 5G network connections according to at least one example embodiment.

FIGS. 5 to 7 illustrate various methods for allocating resource blocks between 4G network connections and 5G network connections according to some example embodiments.

Referring to FIG. 5, a method for allocating resource blocks between 4G network connections and 5G network connections by the hybrid scheduler of FIGS. 2A and 3A is shown. In operation S510, a hybrid scheduler of a BS, such as the hybrid scheduler 230 of BS 200 of FIG. 2A and 3A, may determine resource utilization information corresponding to the 4G connections and 5G connections served by the BS 200 from real-time, or near real-time, data regarding network conditions at the BS 200. The resource utilization information may include information such as, instantaneous and/or near-instantaneous channel state information of the corresponding 4G and 5G channels, transmission buffer status information related to 4G UE devices and the 5G UE devices managed by the hybrid scheduler 230, the respective data throughput of the 4G and 5G UE devices, 4G and 5G utilization metric information, etc. Because the hybrid scheduler 230 is located on the BS 200, and therefore has access to real-time and/or near real-time data regarding the resource utilization of the 4G connections and the 5G connections, the hybrid scheduler 230 may determine the resource utilization information on a resource block-by-resource block basis, slot-by-slot basis, subframe-by-subframe basis, etc. In operation S520, the hybrid scheduler 230 may allocate the next resource block (or next slot, next subframe, etc.) based on the determined 4G and 5G resource utilization information.

The hybrid scheduler 230 may make the allocation determination by calculating the aggregate proportional fair score for all of the 4G connections (e.g., aggregate 4G proportional fair score), and calculating the aggregate proportional fair score for all of the 5G connections (e.g., aggregate 5G proportional fair score). If the hybrid scheduler 230 is scheduling on a slot-by-slot or subframe-by-subframe basis, and if each of the slots or subframes include a plurality of resource blocks, the hybrid scheduler 230 may allocate all of the plurality of resource blocks for the next slot or next subframe to the determined connection type. In operation S530, once the hybrid scheduler 230 has made the resource allocation determination regarding the next resource block, the hybrid scheduler 230 will schedule and/or assign the next resource block to a particular UE connected to the BS 200 of the appropriate connection type. For example, if the hybrid scheduler 230 determines that the next resource block will be a 4G resource block, the hybrid scheduler 230 will also determine which 4G UE device of the 4G UE devices connected to the BS 200 to assign to the 4G resource block.

If the hybrid scheduler 230 is scheduling on a slot-by-slot or subframe-by-subframe basis, and the slots or subframes include a plurality of resource blocks, the hybrid scheduler 230 may assign the plurality of resource blocks for the next slot or next subframe to the UE devices of the appropriate connection type connected to the BS 200.

The hybrid scheduler 230 may assign the resource blocks to the UE devices based on proportional fair score considerations, on a round-robin basis, on a random basis, on a FIFO basis, on an fair access basis, etc., but the example embodiments are not limited thereto.

While FIG. 5 illustrates one method for allocating resource blocks between 4G network connections and 5G network connections by the hybrid scheduler, the example embodiments are not limited thereto, and other methods may be used to allocate resource blocks between 4G network connections and 5G network connections by a hybrid scheduler.

Referring to FIG. 6, a method for allocating resource blocks between 4G network connections and 5G network connections by a resource manager is shown. In operation S610, a resource manager, such as resource manager 140 of FIGS. 1B and 2B, may receive 4G and 5G resource utilization information (e.g., aggregate or summary statistics, estimates, etc.) corresponding to the 4G connections and 5G connections served by the BS 200 from the 4G scheduler and the 5G scheduler of the BS 200. The 4G resource utilization information of this scenario may include information, such as 4G channel state information, upload and/or download transmission buffer status information related to 4G UE devices managed by the 4G scheduler 231, 4G data throughput, 4G utilization metric information, etc., obtained, detected, and/or determined by the 4G scheduler 231. The 5G resource utilization information of this scenario may include information, such as 5G channel state information, upload and/or download transmission buffer status information related to 5G UE devices managed by the 5G scheduler, 5G data throughput, 5G utilization metric information, etc., obtained, detected, and/or determined by the 5G scheduler 232. The 4G resource utilization information and the 5G resource utilization information may be information collected for a previous resource window (e.g., a period including a desired number of resource blocks, a desired number of slots, a desired number of subframes, etc.), but is not limited thereto. Accordingly, the 4G resource utilization information and the 5G resource utilization information may be historical information.

In operation S620, the resource manager 140 may determine resource allocation information for the 4G connections and the 5G connections for the next resource window based on the 4G resource utilization information and the 5G resource utilization information. Additionally, the 4G resource utilization and the 5G resource utilization information may include aggregate proportional fair scores for the 4G connections and the 5G connections calculated by the 4G scheduler 231 and the 5G scheduler 232, respectively. The resource manager 140 may then also determine the resource allocation information based on the 4G and 5G aggregate proportional fair scores between the 4G connections and the 5G connections. For example, for a resource window including 100 resource blocks, the resource manager 140 may determine that 40 of the resource blocks of the next resource window should be allocated to 4G connected UE devices, and 60 resource blocks should be allocated to the 5G connected UE devices, based on the resource utilization information. The resource manager 140 may also determine the schedule of resource blocks for the next resource window, such as determining that the 4G and 5G resource blocks should be interleaved equally, that all of the 4G resource blocks should be scheduled first, that all of the 5G resource blocks should be scheduled first, that the 4G and 5G resource blocks should be scheduled randomly throughout the resource window, etc.

In operation S630, the resource manager 140 may transmit the resource allocation information (e.g., the 4G resource allocation information and the 5G resource allocation information) to the 4G scheduler 231 and the 5G scheduler 232. For example, the resource allocation information may include the 4G resource allocation information and the 5G resource allocation information, and the resource allocation information may be transmitted to the BS 200, and the 4G scheduler 231 and the 5G scheduler 232 may obtain the relevant allocation information from the memory of the BS 200. The 4G scheduler 231 and the 5G scheduler 232 may then, respectively, schedule individual UE devices for the next resource window based on the 4G resource allocation information and the 5G resource allocation information.

While FIG. 6 illustrates one method for allocating resource blocks between 4G network connections and 5G network connections by a resource manager, the example embodiments are not limited thereto, and other methods may be used to allocate resource blocks between 4G network connections and 5G network connections by a resource manager.

Referring to FIG. 7, another method for allocating resource blocks between 4G network connections and 5G network connections using a resource manager is shown. In contrast to the method of FIG. 6, the resource manager 140 of FIG. 7, may not receive any resource utilization information from the 4G scheduler 231 and/or the 5G scheduler 232 of the BS 200. Instead, the resource manager 140 may rely on active connection information obtained from the cellular network, such as the connection manager 130, the RCC layer, etc. The active connection information may include information related to the number of active 4G connections and the number of active 5G connections served by the BS 200. Additionally, the active connection information may represent an actual number of active 4G UE devices and active 5G UE devices connected to the BS 200 monitored by the connection manager 130, or may be an estimate of the number of active 4G UE devices and active 5G UE devices connected to the BS 200. For example, the connection manager 130 may estimate and/or infer the number of active UE devices on the BS 200's network based on the time when the UE device connected to the BS 200, an actual or estimated payload for the UE device, and an actual or estimated number of resource blocks assigned to the UE device, etc. However, the example embodiments are not limited thereto, and the active connection information may be estimated using other techniques.

Similar to FIG. 6, in operation S720, the resource manager 140 may determine resource allocation information for the 4G connections and the 5G connections for the next resource window. However, in contrast to FIG. 6, the resource manager 140 may make the resource allocation information determination solely on the active connection information. The resource manager 140 may also determine the schedule of resource blocks for the next resource window, similar to the resource manager of FIG. 6, but the example embodiments are not limited thereto.

In operation S730, the resource manager 140 may transmit the resource allocation information (e.g., the 4G resource allocation information and the 5G resource allocation information) to the 4G scheduler 231 and the 5G scheduler 232. For example, the resource allocation information may include the 4G resource allocation information and the 5G resource allocation information, and the resource allocation information may be transmitted to the BS 200, and the 4G scheduler 231 and the 5G scheduler 232 may obtain the relevant allocation information from the memory of the BS 200. The 4G scheduler 231 and the 5G scheduler 232 may then, respectively, schedule individual UE devices for the next resource window based on the 4G resource allocation information and the 5G resource allocation information.

Various example embodiments are directed towards a cellular network system capable of providing co-existent service to both 4G LTE devices and 5G NR devices using the same and/or overlapping radio spectrum assigned to the 4G LTE network and the 5G NR network by the cellular network operator. By using the cellular network system of the example embodiments, a cellular network operator may support both legacy 4G LTE UE devices, dual-mode 4G/5G UE devices, and new 5G NR UE devices efficiently and cost-effectively, without having to devote scarce radio frequency spectra to separate 4G and 5G networks.

This written description uses examples of the subject matter disclosed to enable any person skilled in the art to practice the same, including making and using any devices or systems and performing any incorporated methods. The patentable scope of the subject matter is defined by the claims, and may include other examples that occur to those skilled in the art. Such other examples are intended to be within the scope of the claims.

What is claimed is:

1. A system for resource sharing between at least a first cellular radio access network (RAN) and a second cellular RAN sharing a common carrier, the system comprising:
at least one base station, the at least one base station configured to operate a first RAN network and a second RAN network using at least one common carrier;
a resource manager corresponding to the at least one base station, the resource manager configured to,
determine whether to allocate at least one future slot of a radio frame of the common carrier as a first RAN slot or a second RAN slot based on,
received first RAN resource utilization information and received second RAN resource utilization information corresponding to a current slot of the radio frame of the common carrier, or
active connection information corresponding to active first RAN connections served by the at least one base station and active second RAN connections served by the at least one base station,
generate first RAN resource allocation information and second RAN resource allocation information corresponding to the at least one future slot based on results of the determining, and
transmit the first RAN resource allocation information and the second RAN resource allocation information to at least one RAN scheduler corresponding to the at least one base station; and
a connection manager corresponding to the at least one base station, the connection manager configured to determine whether to transmit a connection mode instruction to at least one first RAN user equipment (UE) device connected to the first RAN network to establish a connection to the second RAN network based on an amount of data that has been transmitted to or by the at least one first RAN UE device, and an overhead associated with connecting the at least one first RAN UE device to de second RAN network.

2. The system of claim 1, wherein
the at least one RAN scheduler is configured to,
assign at least one first RAN resource block associated with the at least one future slot to the at least one first RAN UE device based on the first RAN resource allocation information, and
assign at least one second RAN resource block associated with the at least one future slot to at least one second RAN UE device connected to the second RAN network based on the second RAN resource allocation information.

3. The system of claim 1, wherein
the at least one RAN scheduler includes at least a first RAN scheduler and a second RAN scheduler;
the first RAN scheduler is configured to,
determine first RAN channel state information associated with first RAN network connections to the first RAN operated by the at least one base station over the current slot, and
determine the first RAN resource utilization information based on the first RAN channel state information; and the second RAN scheduler is configured to,
   determine second RAN channel state information associated with second RAN network connections to the second RAN operated by the at least one base station over the current slot, and
   determine the second RAN resource utilization information based on the second RAN channel state information.

4. The system of claim 1, wherein
the at least one RAN scheduler includes at least a first RAN scheduler and a second RAN scheduler;
the first RAN scheduler is configured to,
   receive downlink and uplink buffer status information corresponding to at least one first RAN UE device connected to the first RAN network from a connection manager corresponding to the at least one base station, the downlink and uplink buffer status information corresponding to the at least one first RAN UE device including current or historic downlink and uplink buffer status information corresponding to the at least one first RAN UE device, and
   determine the first RAN resource utilization information based on the downlink and uplink buffer status information from the at least one first RAN UE device; and
the second RAN scheduler is configured to,
   receive downlink and uplink buffer status information corresponding to at least one second RAN UE device connected to the second RAN network from the connection manager, the downlink and uplink buffer status information corresponding to the at least one second RAN UE device including current or historic downlink and uplink buffer status information corresponding to the at least one second RAN UE device, and
   determine the second RAN resource utilization information based on the downlink and uplink buffer status information from the at least one second RAN UE device.

5. The system of claim 1, wherein
the at least one RAN scheduler includes at least a first RAN scheduler and a second RAN scheduler;
the first RAN scheduler is configured to calculate a first aggregate proportional fair score for at least one first RAN UE device over the current slot;
the second RAN scheduler is configured to calculate a second aggregate proportional fair score for at least one second RAN UE device over the current slot; and
the resource manager is further configured to determine whether to allocate the at least one future slot as the first RAN slot or e second RAN slot based on the calculated first aggregate proportional fair score and the calculated second aggregate proportional fair score.

6. The system of claim 1, wherein
the at least one RAN scheduler is a hybrid RAN scheduler;
the hybrid RAN scheduler includes the resource manager; and
the at least one base station includes the hybrid RAN scheduler.

7. The system of claim 1, wherein
the at least one RAN scheduler includes at least a first RAN scheduler and a second RAN scheduler;
the at least one base station includes the first RAN scheduler and the second RAN scheduler; and
the resource manager is located on a backend network connected to the at least one base station.

8. The system of claim 1, wherein
the at least one RAN scheduler includes at least a first RAN scheduler and a second RAN scheduler;
the at least one base station includes at least a first base station and a second base station;
the first base station includes the first RAN scheduler; and
the second base station includes the second RAN scheduler.

9. The system of claim 1, wherein
the at least one RAN scheduler is further configured to,
   calculate a first aggregate proportional fair score for at least one first RAN UE device connected to the at least one base station over a previous resource window of the common carrier,
   transmit the first aggregate proportional fair score to the resource manager,
   calculate a second aggregate proportional fair score for at least one second RAN UE device connected to the at least one base station over the previous resource window, and
   transmit the second aggregate proportional fair score to the resource manager; and
the resource manager is further configured to determine the first RAN resource allocation information and the second RAN resource allocation information by,
   determining a first number of resource blocks of a future resource window of the common carrier, the future resource window including a plurality of resource blocks, and a second number of resource blocks of the future resource window based on the first aggregate proportional fair score and the second aggregate proportional fair score, the first number associated with first RAN connections, and the second number associated with second RAN connections.

10. The system of claim 1, wherein
the resource manager is further configured to,
   determine a number of active first RAN UE devices connected to the at least one base station over a previous resource window of the common carrier,
   determine a number of active second RAN UE devices connected to the at least one base station over the previous resource window, and
   determine the first RAN resource allocation information and the second RAN resource allocation information by,
      determining a first number of resource blocks of a future resource window of the common carrier, the future resource window including a plurality of resource blocks, and a second number of resource blocks of the future resource window based on the number of active first RAN UE devices and the number of active second RAN UE devices, the first number associated with first RAN connections, and the second number associated with second RAN connections.

11. A method for sharing resources between at least a first cellular radio access network (RAN) and a second cellular RAN operated by at least one base station, the first RAN network and the second RAN network sharing a common carrier, the method comprising:
   receiving, using at least one processor, first RAN resource utilization information and second RAN resource utilization information corresponding to a current slot of a radio frame of a common carrier, or
   receiving, using the at least one processor, active connection information corresponding to active first RAN connections served by the at least one base station and active second RAN connections;

determining, using the at least one processor, whether to allocate at least one future slot of a radio frame of the common carrier as a first RAN slot or a second RAN slot based on the received first RAN resource utilization information and the received second RAN resource utilization information, or the received active connection information;

generating, using the at least one processor, first RAN resource allocation information and second RAN resource allocation information corresponding to the at least one future slot based on results of the determining;

transmitting, using the at least one processor, the first RAN resource allocation information and the second RAN resource allocation information to at least one RAN scheduler corresponding to at least one base station; and determining, using the at least one processor, whether to transmit a connection mode instruction to at least one first RAN user equipment (UE) device connected to the first RAN network to establish a connection to the second RAN network based on an amount of data that has been transmitted to or by the at least one first RAN UE device, and an overhead associated with connecting at least one first RAN UE device to the second RAN network.

12. The method of claim 11, wherein the at least one RAN scheduler includes at least a first RAN scheduler and a second RAN scheduler;

the first RAN scheduler is caused to assign at least one first RAN resource block associated with the at least one future slot to the at least one first RAN UE device based on the first RAN resource allocation information; and the second RAN scheduler is caused to assign at least one second RAN resource block associated with the at least one future slot to at least one second RAN UE device based on the second RAN resource allocation information.

13. The method of claim 11, wherein the first RAN resource utilization information includes first RAN channel state information associated with first RAN network connections over at least one current slot; and the second RAN resource utilization information includes second RAN channel state information associated with second RAN network connections over the at least one current slot.

14. The method of claim 11, wherein the first RAN resource utilization information includes downlink and uplink buffer status information corresponding to at least one first RAN user equipment (UE) device connected to the first RAN network from a connection manager corresponding to the at least one base station, the downlink and uplink buffer status information corresponding to the at least one first RAN UE device including current or historic downlink and uplink buffer status information corresponding to the at least one first RAN UE device; and the second RAN resource utilization information includes downlink and uplink buffer status information corresponding to at least one second RAN UE device connected to the second RAN network from the connection manager, the downlink and uplink buffer status information corresponding to the at least one second RAN UE device including current or historic downlink and uplink buffer status information corresponding to the at least one second RAN UE device.

15. The method of claim 11, wherein the first RAN resource utilization information includes a first aggregate proportional fair score for at least one first RAN UE device connected to the at least one base station over at least one current slot; and the second RAN resource utilization information includes a second aggregate proportional fair score for at least one second RAN UE device connected to the at least one base station over the at least one current slot.

16. The method of claim 11, wherein the first RAN resource utilization information includes a first aggregate proportional fair score for at least one first RAN UE device connected to the first RAN network over a previous resource window of the common carrier;

the second RAN resource utilization information includes a second aggregate proportional fair score for at least one second RAN UE device connected to the second RAN network over the previous resource window; and the determining the first RAN resource allocation information and the second RAN resource allocation information includes, determining a first number of first RAN resource blocks of a future resource window of the common carrier and a second number of second RAN resource blocks of the future resource window based on the first aggregate proportional fair score and the second aggregate proportional fair score, the first number associated with first RAN connections, and the second number associated with second RAN connections, the future resource window including a plurality of resource blocks.

17. The method of claim 11, the method further comprising, determining, using the at least one processor, a number of active first RAN UE devices connected to the at least one base station over a previous resource window of the common carrier;

determining, using the at least one processor, a number of active second RAN UE devices connected to the at least one base station over the previous resource window; and the determining the first RAN resource allocation information and the second RAN resource allocation information includes, determining a first number of first RAN resource blocks of a future resource window of the common carrier and a second number of second RAN resource blocks of the future resource window based on the number of active first RAN UE devices and the number of active second RAN UE devices, the first number associated with first RAN connections, and the second number associated with second RAN connections, the future resource window including a plurality of resource blocks.

18. The method of claim 11, wherein the at least one RAN scheduler is a hybrid RAN scheduler; and the at least one base station includes the hybrid RAN scheduler and the at least one processor.

19. The method of claim 11, wherein the at least one RAN scheduler includes at least a first RAN scheduler and a second RAN scheduler; and the at least one base station includes the first RAN scheduler and the second RAN scheduler.

20. A network device for enabling the sharing of common carrier resources between at least one first radio access network (RAN) user equipment (UE) device connected to a first RAN, and at least one second RAN UE device connected to a second RAN, the network device comprising:
- a memory having computer readable instructions stored thereon; and
- at least one processor configured to execute the computer readable instructions to,
  - determine an amount of data transmitted to or by at least one first RAN UE device connected to a first RAN network during a desired time period;
  - determine whether to transmit a connection mode instruction to the at least one first RAN UE device to establish a connection to a second RAN network based on the determined amount of data, and an overhead associated with connecting the at least one first RAN UE device to the second RAN network; and
  - establish a connection between the at least one first RAN UE device and the second RAN network based on results of the determination.

* * * * *